US012804441B2

(12) United States Patent
Guo et al.

(10) Patent No.: US 12,804,441 B2
(45) Date of Patent: Nov. 17, 2026

(54) METHOD AND APPARATUS FOR QUALITY OF SERVICE ANALYTICS AND NETWORK ELEMENTS

(71) Applicant: GUANGDONG OPPO MOBILE TELECOMMUNICATIONS CORP., LTD., Dongguan (CN)

(72) Inventors: Boren Guo, Dongguan (CN); Yang Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 296 days.

(21) Appl. No.: 18/653,853

(22) Filed: May 2, 2024

(65) Prior Publication Data

US 2024/0284246 A1 Aug. 22, 2024

Related U.S. Application Data

(63) Continuation of application No. PCT/CN2021/138572, filed on Dec. 15, 2021.

(51) Int. Cl.
*H04W 4/02* (2018.01)
*H04W 24/08* (2009.01)
(Continued)

(52) U.S. Cl.
CPC ............ *H04W 24/10* (2013.01); *H04W 4/02* (2013.01); *H04W 24/08* (2013.01);
(Continued)

(58) Field of Classification Search
CPC .. H04B 17/0082–409; H04L 43/02–55; H04L 47/24–2491; H04W 4/02–029;
(Continued)

(56) References Cited

U.S. PATENT DOCUMENTS

2020/0112907 A1* 4/2020 Dao .................. H04W 28/0268
2020/0374743 A1* 11/2020 Xin .................. H04W 28/0268

FOREIGN PATENT DOCUMENTS

CN 101646158 2/2010
CN 108366391 8/2018
(Continued)

OTHER PUBLICATIONS

"3rd Generation Partnership Project; Technical Specification Group Services and System Aspects; Architecture enhancements for 5G System (5GS) to support network data analytics services (Release 17)," 3GPP TS 23.288, Sep. 2021, v17.2.0.
(Continued)

*Primary Examiner* — Timothy J Weidner
(74) *Attorney, Agent, or Firm* — Hodgson Russ LLP

(57) ABSTRACT

This disclosure discloses a first network element and a second network element. The first network element has data analytics capability, and includes a transceiver, a memory configured to store executable instructions, and a processor configured to execute the executable instructions stored in the memory to cause the transceiver to notify, to a second network element, QoS of an analytics target according to a QoS analytics request from the second network element. The analytics target is indicated by the QoS analytics request.

20 Claims, 9 Drawing Sheets

(51) Int. Cl.

| | |
|---|---|
| ***H04W 24/10*** | (2009.01) |
| ***H04W 28/02*** | (2009.01) |
| ***H04W 64/00*** | (2009.01) |
| ***H04W 84/02*** | (2009.01) |
| ***H04W 88/18*** | (2009.01) |
| ***H04W 92/02*** | (2009.01) |

(52) U.S. Cl.
CPC ....... *H04W 28/0268* (2013.01); *H04W 64/00* (2013.01); *H04W 84/02* (2013.01); *H04W 88/18* (2013.01); *H04W 92/02* (2013.01)

(58) Field of Classification Search
CPC ..... H04W 8/18–245; H04W 24/02–10; H04W 28/02–26; H04W 36/0005–385; H04W 64/00–006; H04W 76/10–50; H04W 84/005–22; H04W 88/005–188; H04W 92/02–24
See application file for complete search history.

(56) References Cited

FOREIGN PATENT DOCUMENTS

| | | |
|---|---|---|
| CN | 110149657 | 8/2019 |
| CN | 111866977 | 10/2020 |
| JP | 2012244497 | 12/2012 |

OTHER PUBLICATIONS

WIPO, International Search Report and Written Opinion for International Application No. PCT/CN2021/138572, Sep. 2, 2022.

* cited by examiner

METHOD AND APPARATUS FOR QUALITY OF SERVICE ANALYTICS AND NETWORK ELEMENTS

CROSS-REFERENCE TO RELATED APPLICATION(S)

This application is a continuation of International Application No. PCT/CN2021/138572, filed Dec. 15, 2021, the entire disclosure of which is incorporated herein by reference.

TECHNICAL FIELD

This disclosure relates to the field of mobile communication, and in particular, to network elements.

BACKGROUND

In the 5th generation mobile communication technology (5G) system, via a core network element and an operations administration and maintenance (OAM) network element, a network data analytics function (NWDAF) network element can obtain related data of an analytics target (a terminal) and generate an analytics result of communication situation related to the analytics target. The NWDAF network element supports analytics and notifies "quality of service (QoS) sustainability" of the analytics target.

The "QoS sustainability" can provide statistical information of a QoS change of the analytics target in a certain area over a past-applicable time-period, or likelihood prediction of a QoS change of the analytics target in the certain area over a future target time-period. The analytics target may be any user equipment (UE) service. A consumer using the above analytics service may be one network element.

In the related art, the consumer using the above analytics service is a network element that belongs to the same core network as the NWDAF network element. QoS analytics for the analytics target still needs further discussion and research.

SUMMARY

Embodiments of the disclosure provide a first network element and a second network element.

According to one aspect of the disclosure, a first network element is provided. The first network element has data analytics capability, and includes a transceiver, a memory configured to store executable instructions, and a processor configured to execute the executable instructions stored in the memory to cause the transceiver to notify, to a second network element, quality of service (QoS) of an analytics target according to a QoS analytics request from the second network element. The analytics target is indicated by the QoS analytics request.

According to another aspect of the disclosure, a second network element is provided. The second network element includes a transceiver, a memory configured to store executable instructions, and a processor configured to execute the executable instructions stored in the memory to cause the transceiver to: receive, from a first network element, QoS of an analytics target, the first network element having data analytics capability, the QoS of an analytics target being responsive to a QoS analytics request from the second network element, and the analytics target being indicated by the QoS analytics request.

BRIEF DESCRIPTION OF THE DRAWINGS

In order to describe technical solutions in embodiments of the disclosure more clearly, the following will give a brief introduction to the accompanying drawings used for describing the embodiments. Apparently, the accompanying drawings described below are merely some embodiments of the disclosure. Based on these drawings, those of ordinary skill in the art can also obtain other drawings without creative effort.

DETAILED DESCRIPTION

Figure 1:
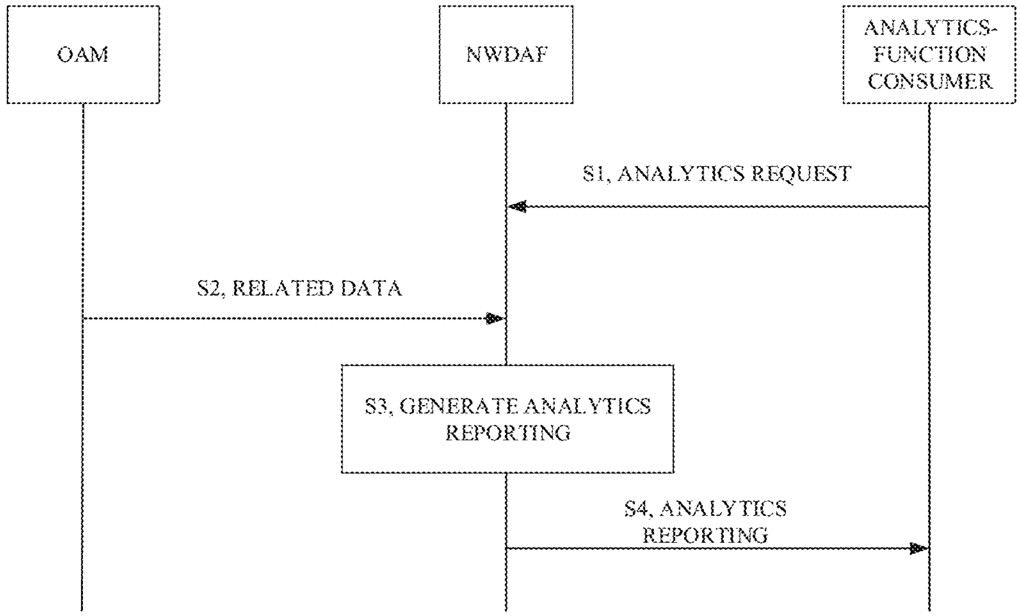
FIG. 1 is a schematic diagram illustrating a procedure for analyzing quality of service (QoS) provided in an exemplary embodiment of the disclosure.

In order for clarity in elaboration of objectives, technical solutions, and advantages of the disclosure, the following will further describe implementations of the disclosure in detail with reference to the accompanying drawings.

Exemplary embodiments will be described in detail herein, and examples of these embodiments are illustrated in the accompanying drawings. When the following elaborations relate to the accompanying drawings, unless otherwise stated, the same numerals in different accompanying drawings refer to the same or similar elements. The implementations described in the following exemplary embodiments are not intended to represent all implementations consistent with the disclosure. Instead, they are merely examples of apparatuses and methods consistent with some aspects of the disclosure as elaborated in the appended claims.

The terms used in the disclosure are merely intended for describing particular embodiments, rather than limiting the disclosure. The singular form "a/an", "said", and "the" used in the disclosure and the appended claims are also intended to include multiple forms, unless specified otherwise in the context. It may also be understood that, the term "and/or" used herein refers to any or all of possible combinations of one or more associated items that are listed.

It may be understood that, although the terms "first", "second", "third", and the like may be used in the disclosure to describe various information, such information will not be limited to these terms. These terms are merely used for distinguishing the same type of information from each other. For example, without departing from the scope of the disclosure, first information may also be referred to as second information, and similarly, second information may also be referred to as first information, depending on the context. For example, the word "if" used herein may be interpreted as "at . . . ", or "when . . . ", or "in response to a determination".

First, the following will give an introduction to technical background involved in embodiments of the disclosure.

Introduction to "Quality of Service (QoS) Sustainability" Analytics

A network data analytics function (NWDAF) network element (also referred to as an NWDAF) is a key network element that provides intelligence capability for the 5th generation mobile communication technology (5G) system. Through interaction with a core network element and operations administration and maintenance (OAM) (i.e., an OAM network element), the NWDAF network element can obtain data and generate an analytics result of relevant communication situation for an analytics target. "QoS sustainability" is one of analytics results that the NWDAF network element can analyze and notify, and "QoS sustainability" can provide QoS change statistics of the analytics target in a certain area over a certain time period in the past or QoS change predictions of the analytics target in a certain area over a certain time period in the future. The analytics target is any user equipment (UE) service. A consumer of the analytics service is one network element. By sending a QoS analytics request (a QoS sustainability analytics request) to the NWDAF network element, the consumer of the analytics service can obtain QoS sustainability analytics notified by the NWDAF network element. The QoS analytics request contains the following parameters:

- an analytics identifier (ID);
- a target of analytics reporting;
- analytics filter information containing:
  - a QoS requirement (mandatory);
    - a 5G QoS identifier (5QI), and applicable additional QoS parameters and the corresponding values; and
    - QoS characteristics attributes;
  - location information (mandatory); and
  - single-network slice selection assistance information (S-NSSAI) (optional);
- optional maximum number of objects;
- an analytics target period; and
- a reporting threshold.

The analytics ID is "QoS sustainability" and indicates to the NWDAF network element that the analytics request is used for analyzing QoS sustainability. The target of analytics reporting indicates the analytics target, e.g., any UE service. The QoS requirements indicate a type of QoS to be analyzed. The 5QI is standardized or pre-configured. The location information indicates a location (for example, an area or a path of interest) used for analyzing QoS. The location information may be a list of waypoints. The S-NSSAI indicates a network slice used for analyzing QoS. The optional maximum number of objects indicates the maximum number of objects provided in analytics reporting information upon performing QoS analytics. The analytics target period indicates a time period used for QoS analytics, usually a past time period or a future time period. The reporting threshold indicates a triggering condition specified in a subscription service for notifying the QoS analytics reporting. That is, the NWDAF can notify the QoS analytics reporting only when QoS obtained from analytics satisfies the reporting threshold.

The NWDAF can collect statistical information regarding QoS from the core network element and OAM. When the analytics reporting targets a certain time period in the past, the NWDAF can notify the reporting threshold that triggers feedback of the analytics reporting. When the analytics reporting targets a certain time period in the future, the NWDAF can detect, by comparing an expected QoS value analyzed against the reporting threshold, whether a potential QoS change needs to be notified. The expected QoS value is derived from the statistics for the 5QI obtained from OAM. Information obtained through OAM may further include planned or unplanned outages detection and other information. The QoS analytics reporting notified by the NWDAF includes the reporting threshold corresponding to the potential QoS change.

Exemplarily, Table 1 illustrates input data for the NWDAF to generate "QoS sustainability" analytics.

TABLE 1

| Information | Data source | Description |
|---|---|---|
| Radio access network (RAN) UE throughput | OAM | Average UE bitrate per timeslot, per cell, per 5QI, and per S-NSSAI |
| QoS flow retainability | OAM | Number of abnormally released QoS flows per timeslot, per cell, per 5QI, and per S-NSSAI |

Exemplarily, Table 2 illustrates the content of NWDAF-generated "QoS sustainability" analytics reporting targeting statistics in the past.

TABLE 2

| Information | Description |
|---|---|
| Applicable area | A list of tracking area identities (TAIs) or cell identity document (IDs) applicable to the analytics reporting |
| Applicable time period | An applicable time period applicable to the analytics reporting |
| Reporting threshold | The reporting threshold met or exceeded by the statistical QoS value |

Exemplarily, Table 3 illustrates the content of NWDAF-generated "QoS sustainability" analytics reporting targeting predictions in the future.

TABLE 3

| Information | Description |
|---|---|
| Applicable area | A list of TAIs or cell IDs applicable to the analytics reporting |
| Applicable time period | An applicable time period applicable to the analytics reporting |
| Reporting threshold | The reporting threshold met or exceeded by the expected QoS value |
| Confidence | Confidence of predictions |

Exemplarily, FIG. 1 is a schematic diagram illustrating a procedure for analyzing QoS provided in an exemplary embodiment of the disclosure. As illustrated in FIG. 1, at S1, an analytics-function consumer (a network element belonging to the same core network as the NWDAF) requests or subscribes to QoS sustainability analytics services provided by the NWDAF. At S2, the NWDAF collects related data from the OAM. At S3, the NWDAF verifies whether the analyzed QoS satisfies the triggering condition (the reporting threshold), and generates the requested analytics (the analytics reporting). For example, by comparing the analyzed 5QI against the reporting threshold provided by the analytics-function consumer, the NWDAF can detect whether the potential QoS change needs to be notified. At S4, the NWDAF delivers the QoS sustainability analytics (the analytics reporting) to the analytics-function consumer.

When QoS analytics is performed in the above manners, there are the following problems.

(1) When the analytics-function consumer is an external network element of the core network where the NWDAF is located, the location information in the request information of the analytics-function consumer is usually global positioning system (GPS) coordinates and the like. The location information that can be identified by an internal network element of the core network is usually an area of interest (AOI), a TAI, a cell ID, and the like. The above manners do not take into consideration the scenario where the analytics-function consumer is the external network element of the core network, and thus, QoS analytics cannot be supported in this case.

(2) The output analytics only contains the "applicable time period", the "applicable location", and the "reporting threshold" triggering to notify the analytics reporting. In the above manners, the analytics-function consumer can only know from the "QoS sustainability" analytics the reporting threshold and whether a statistical value or a predicted value of QoS of the analytics target corresponding to the applicable time period in the requested applicable area satisfies the corresponding reporting threshold, but cannot know more details about QoS, which has a relatively single analytics dimension.

Based on the method provided in embodiments of the disclosure, a procedure for related-information routing during the "QoS sustainability" analytics is provided. In the method, the external location information that cannot be identified by the core network can be mapped to the internal location information that can be identified by the core network, thereby implementing QoS analytics for the external location information. In addition, the method further expands QoS analytics output entries and provides more dimensions for QoS analytics feedback.

Figure 2:
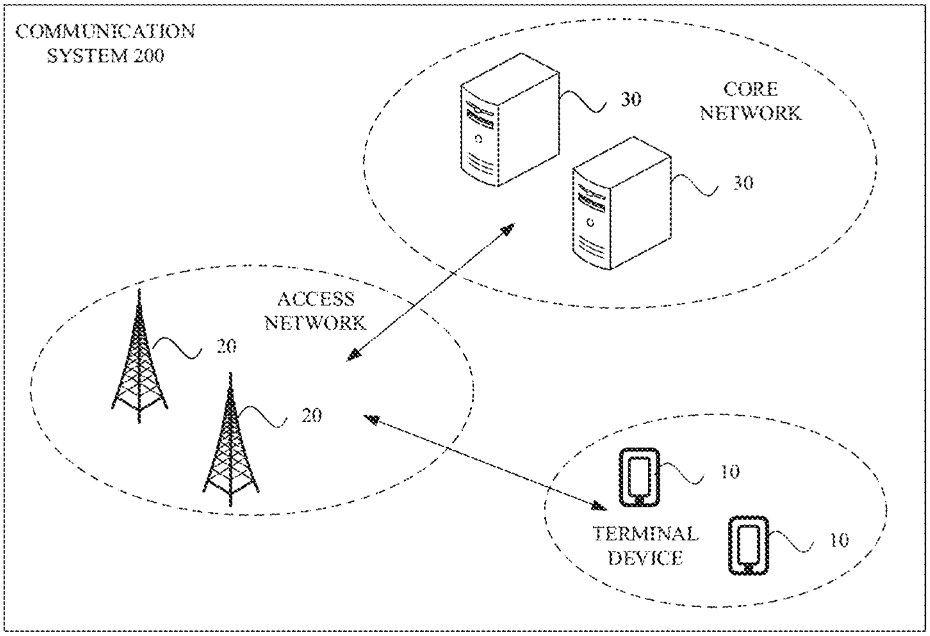
FIG. 2 is a schematic diagram of a system architecture of a communication system provided in an exemplary embodiment of the disclosure.

FIG. 2 illustrates a schematic diagram of a system architecture of a communication system provided in an embodiment of the disclosure. The system architecture may include: a terminal device 10, an access-network device 20, and a core-network device 30.

The terminal device 10 may refer to a UE, an access terminal, a subscriber unit, a subscriber station, a mobile station, a remote station, a remote terminal, a mobile device, a wireless communication device, a user agent, or a user device. Optionally, the terminal device may also be a cellular radio telephone, a cordless telephone, a session initiation protocol (SIP) telephone, a wireless local loop (WLL) station, a personal digital assistant (PDA), a device with wireless communication functions such as a handheld device, a computing device, or other processing devices coupled with a wireless modem, an in-vehicle device, a wearable device, a terminal device in the 5th generation system (5GS), or a terminal device in a future evolved public land mobile network (PLMN), or the like. Embodiments of the disclosure are not limited in this regard. For the convenience of illustration, the foregoing devices are collectively referred to as "terminal device". The number of terminal devices 10 is usually multiple, and there may be one or more terminal devices 10 in each cell managed by the access-network device 20.

The access-network device 20 is a device deployed in an access network to provide a wireless communication function for the terminal device 10. The access-network device 20 may include various forms of macro base stations, micro base stations, relay stations, access points, and the like. In systems adopting different radio access technologies, devices having a function of the access-network device may be in different names, for example, in a 5G new radio (NR) system, such a device is referred to as a gNodeB or a gNB. With evolution of communication technologies, the name "access-network device" may change. For the convenience of illustration, in embodiments of the disclosure, the foregoing apparatus for providing a wireless communication function for the terminal device 10 is collectively referred to as "access-network device". Optionally, via the access-network device 20, the terminal device 10 and the core-network device 30 can establish a communication relationship. Exemplarily, in an LTE system, the access-network device 20 may be an evolved universal terrestrial radio access network (EUTRAN) or one or more eNodeBs in the EUTRAN; and in the 5G NR system, the access-network device 20 may be an RAN or one or more gNBs in the RAN.

The functions of the core-network device 30 are mainly to provide a user connection, manage a user, and complete service bearing, and the core-network device 30 is used as an interface provided by a bearer network for an external network. For example, the core-network device in the 5G NR system may include devices such as an access and mobility management function (AMF) entity, a user plane function (UPF) entity, and a session management function (SMF) entity. The access-network device 20 and the core-network device 30 may be collectively referred to as the network device.

In one example, the access-network device 20 and the core-network device 30 communicate with each other via some over-the-air technology, such as an NG interface in a 5G NR system. The access-network device 20 and the terminal device 10 communicate with each other via some over-the-air technologies, such as a Uu interface.

Figure 3:
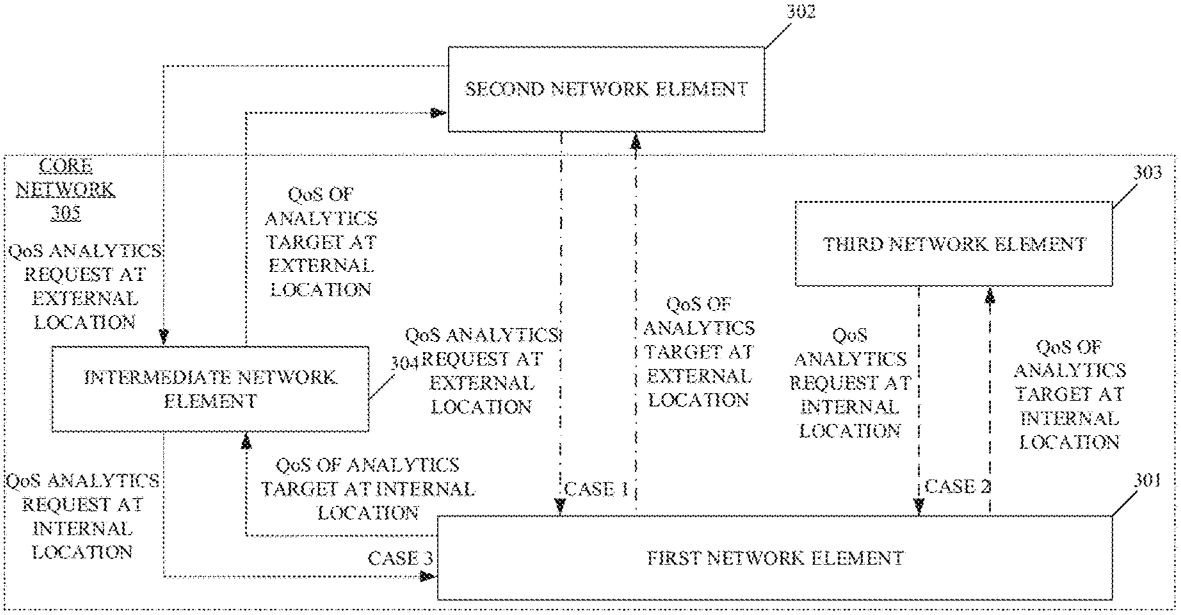
FIG. 3 is a schematic diagram illustrating a procedure for analyzing QoS provided in an exemplary embodiment of the disclosure.

The method provided in embodiments of the disclosure can implement QoS analytics corresponding to external location information and support more detailed QoS analytics. The method provided in embodiments of the disclosure is described as a whole with reference to FIG. 3. FIG. 3 is a schematic diagram illustrating a procedure for analyzing QoS provided in an exemplary embodiment of the disclosure. As illustrated in FIG. 3, in a first case, a second network element 302 sends a QoS analytics request to a first network element 301, where the QoS analytics request contains external location information. The first network element 301 maps the external location information to internal location information, and performs QoS analytics for an analytics target corresponding to the internal location information according to the mapped QoS analytics request. Then, the internal location information is mapped to the external location information, and a QoS analytics result of the analytics target corresponding to the external location information is sent to the second network element 302. The analytics target is indicated by the QoS analytics request. The external location information is location information determined by the second network element 302, and the internal location information is location information used by a core network 305 where the first network element 301 is located. The second network element 302 does not belong to the core network 305 where the first network element 301 is located, and the first network element 301, for example, an NWDAF network element, has data analytics capability. In the first case, the first network element 301 can also have capability to analyze QoS of the analytics target corresponding to the external location information. In this case, according to the above QoS analytics request, the first network element 301 can directly analyze the QoS of the analytics target corresponding to the external location information and notify the analytics result to the second network element 302.

In a second case, a third network element 303 sends a QoS analytics request to the first network element 301, where the QoS analytics request contains internal location information. The third network element 303 belongs to the core network 305 where the first network element 301 is located. The first network element 301 performs QoS analytics for an analytics target according to the QoS analytics request, and then sends a QoS analytics result to the third network element 303. The analytics target is indicated by the QoS analytics request.

In a third case, the second network element 302 sends a QoS analytics request to an intermediate network element 304, where the QoS analytics request contains external location information. The intermediate network element 304 belongs to the core network 305 where the first network element 301 is located. The intermediate network element 304 maps the external location information to internal location information, and sends the mapped QoS analytics request to the first network element 301 for QoS analytics. Then, the first network element 301 sends to the intermediate network element 304 a QoS analytics result of the analytics target corresponding to the internal location information. The intermediate network element 304 maps the internal location information to the external location information, and sends to the second network element 302 a QoS analytics result of the analytics target corresponding to the external location information. The analytics target is indicated by the QoS analytics request. Optionally, the method provided in embodiments of the disclosure can simultaneously support the above three cases, or support some of the above three cases.

In addition, when performing QoS analytics, the first network element 301 can further determine the content of the QoS analytics result according to indication information in the QoS analytics request. Optionally, the QoS analytics request contains at least one of first indication information, second indication information, or third indication information. The following describes the QoS analytics result obtained based on the QoS analytics request containing different indication information.

QoS of the analytics target includes a historical QoS value of the analytics target in analytics-applicable time, in case where the QoS analytics request contains the first indication information and the analytics-applicable time belongs to a historical time period.

QoS of the analytics target includes a difference between a reporting threshold and the historical QoS value of the analytics target in the analytics-applicable time, in case where the QoS analytics request contains the second indication information and the analytics-applicable time belongs to the historical time period.

In case where the QoS analytics request contains the third indication information and the analytics-applicable time belongs to the historical time period, QoS of the analytics target includes at least one of: a condition on which the historical QoS value of the analytics target in the analytics-applicable time satisfies the reporting threshold, or a condition on which the historical QoS value of the analytics target in the analytics-applicable time does not satisfy the reporting threshold.

QoS of the analytics target includes a predicted QoS value of the analytics target in the analytics-applicable time, in case where the QoS analytics request contains the first indication information and the analytics-applicable time belongs to a future time period.

QoS of the analytics target includes a change trend of the predicted QoS value of the analytics target in the analytics-applicable time compared with a reporting threshold, in case where the QoS analytics request contains the second indication information and the analytics-applicable time belongs to a future time period.

In case where the QoS analytics request contains the third indication information and the analytics-applicable time belongs to a future time period, QoS of the analytics target includes at least one of: a condition on which the predicted QoS value of the analytics target in the analytics-applicable time satisfies the reporting threshold, or a condition on which the predicted QoS value of the analytics target in the analytics-applicable time does not satisfy the reporting threshold.

By mapping the external location information to the internal location information, QoS analytics can be implemented based on the external location information, thereby implementing the function of providing the QoS analytics for an external network element of the core network, which takes into consideration the scenario where an analytics-function consumer is the external network element of the core network. The limitation that the QoS analytics is only used for an internal network element is solved, and the application range of the QoS analytics is expanded.

Furthermore, analyzing a specific value of the QoS of the analytics target and its variation compared with the reporting threshold helps increase the reliability of the predicted QoS result. For example, when predicting a future QoS change, compared with using only binary information (yes or no) regarding whether QoS satisfies the reporting threshold, using statistics on the level of QoS deviation from the reporting threshold over a past time period will be more beneficial for machine learning algorithms to predict a future QoS change trend of the analytics target. Therefore, the reliability of the generated QoS analytics result can be enhanced. The content of the QoS analytics reporting is enriched with respect to the statistical output of a historical QoS value, the level of QoS deviation from the reporting threshold, and a condition for QoS changes, as well as with respect to the prediction output of a predicted QoS value, a QoS change trend, and a condition for QoS change. This helps the analytics-function consumer to better determine the QoS change of the analytics target in a certain area over a certain time period, so as to develop a corresponding strategy to provide high-QoS services for the analytics target in a sustainable and stable manner.

Figure 4:
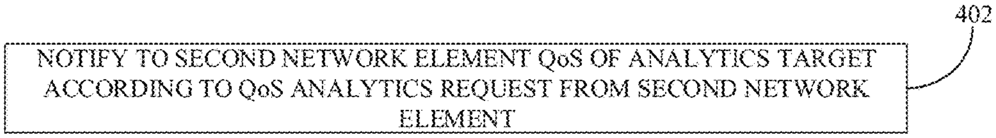
FIG. 4 is a flowchart of a method for QoS analytics provided in an exemplary embodiment of the disclosure.

FIG. 4 illustrates a flowchart of a method for QoS analytics provided in an embodiment of the disclosure. The method is performed by a first network element, and the first network element may be a network element of a core network in the communication system illustrated in FIG. 2. The method includes the following.

At 402: QoS of an analytics target is notified to a second network element according to a QoS analytics request from the second network element.

The first network element has data analytics capability, for example, an NWDAF network element or another intelligent network element capable of performing data analytics and generating an analytics result. The first network element is a network element in a core network, and the first network element belongs to the core network. The second network element does not belong to the core network, and the second network element is an external network element of the core network, e.g., an application (APP) in the UE.

The analytics target is indicated by the QoS analytics request, for example, a service of a target UE. The target UE includes a particular UE, a group of UEs with the same characteristics attributes, or any UE. The service of the target UE refers to services performed by the target UE based on the mobile communication network, for example, receiving messages, sending messages, watching videos, and the like. Optionally, the QoS request further includes analytics-applicable time, where the analytics-applicable time includes a moment or a time period. The analytics-applicable time indicates time used for analyzing QoS. The analytics-applicable time belongs to a historical time period, to a future time period, or to both the historical time period and the future time period. Optionally, in case where the analytics-applicable time belongs to both the historical time period and the future time period, the first network element can split the analytics-applicable time into the time belonging to the historical time period and the time belonging to the future time period, and perform QoS analytics separately. Optionally, the QoS analytics request further includes a reporting threshold, where the reporting threshold is used for triggering to notify a QoS analytics result. That is, the first network element can determine, based on the reporting threshold and the QoS of the analytics target obtained from analytics, whether to notify to the second network element the QoS of the analytics target.

Optionally, the QoS analytics request contains external location information, and the external location information is location information determined by the second network element. The first network element can notify to the second network element QoS of the analytics target corresponding to the external location information according to the QoS analytics request.

The external location information is location information that cannot be identified by the core network, that is, location information that cannot be identified by the first network element. The internal location information is location information that can be identified by the core network, that is, location information that can be identified by the first network element. The external location information is location information provided by a third party. Optionally, the external location information includes at least one of: location information determined based on GPS positioning, location information determined based on wireless communication technology (Wi-Fi) positioning, or location information determined based on base station positioning. The external location information includes a location point, an area, or a trajectory, or the like, for example, latitude-and-longitude coordinates and address information (for example, No. xx, xx Street, xx District, xx City). The internal location information is location information used for internal interaction and analytics in the 5GS. Optionally, the internal location information includes at least one of: one or more AOIs; one or more TAIs; or one or more cell IDs.

Optionally, the first network element has capability to analyze the QoS of the analytics target corresponding to the external location information. That is, according to the QoS analytics request from the second network element, the first network element can directly analyze the QoS of the analytics target corresponding to the external location information and notify to the second network element.

Optionally, when receiving the QoS analytics request sent by the second network element, the first network element can further determine whether the location information in the QoS analytics request is location information that can be identified by the core network. In case where the location information is location information that cannot be identified by the core network, the first network element can map the location information that cannot be identified by the core network to the location information that can be identified by the core network, that is, map the external location information to the internal location information. For example, in case where the external location information is the location point, the first network element can map the location point to the ID of a cell where the location point is located. In case where the external location information is the trajectory, the first network element can map the trajectory to multiple TAIs through which the trajectory passes.

Optionally, the first network element has capability to map the external location information to the internal location information. The first network element directly maps the external location information to the internal location information. Alternatively, the first network element maps the external location information to the internal location information via a mapping module, where the mapping module is an internal module of the first network element. Optionally, the first network element can determine the internal location information corresponding to the external location information based on data indicating a correspondence between the external location information and the internal location information, so that the external location information can be mapped to the internal location information. In the mapping process, the external location information in the QoS analytics request can be mapped to the internal location information and other information in the QoS analytics request remains unchanged.

Optionally, the QoS analytics request further contains at least one of: first indication information; second indication information; or third indication information.

The first indication information indicates the first network element to notify a specific value of the QoS of the analytics target corresponding to the external location information. The second indication information indicates the first network element to notify a difference between the reporting threshold and the specific value of the QoS of the analytics target corresponding to the external location information. The third indication information indicates the first network element to notify at least one of: a condition on which the specific value of the QoS of the analytics target corresponding to the external location information satisfies the reporting threshold, or a condition on which the specific value of the QoS of the analytics target corresponding to the external location information does not satisfy the reporting threshold.

Exemplarily, the QoS analytics result includes a historical QoS value of the analytics target corresponding to the external location information and the analytics-applicable time, in case where the QoS analytics request contains the first indication information and the analytics-applicable time belongs to the historical time period. The QoS analytics result includes a difference between the reporting threshold and the historical QoS value of the analytics target corresponding to the external location information and the analytics-applicable time, in case where the QoS analytics request contains the second indication information and the analytics-applicable time belongs to the historical time period. In case where the QoS analytics request contains the third indication information and the analytics-applicable time belongs to the historical time period, the QoS analytics result includes at least one of: a condition on which the historical QoS value of the analytics target corresponding to the external location information and the analytics-applicable time satisfies the reporting threshold, or a condition on which the historical QoS value of the analytics target corresponding to the external location information and the analytics-applicable time does not satisfy the reporting threshold. The QoS analytics result includes a predicted QoS value of the analytics target corresponding to the external location information and the analytics-applicable time, in case where the QoS analytics request contains the first indication information and the analytics-applicable time belongs to the future time period. The QoS analytics result includes a change trend of the predicted QoS value of the analytics target corresponding to the external location information and the analytics-applicable time compared with the reporting threshold, in case where the QoS analytics request contains the second indication information and the analytics-applicable time belongs to the future time period. In case where the QoS analytics request contains the third indication information and the analytics-applicable time belongs to the future time period, the QoS analytics result includes at least one of: a condition on which the predicted QoS value of the analytics target corresponding to the external location information and the analytics-applicable time satisfies the reporting threshold, or a condition on which the predicted QoS value of the analytics target corresponding to the external location information and the analytics-applicable time does not satisfy the reporting threshold.

Optionally, the QoS analytics request further includes a QoS requirement, the QoS requirement indicates a type of a historical QoS value and a type of a predicted QoS value to be analyzed, and the type includes at least one of: a resource type; a priority level; a packet delay budget (PDB); a packet error rate (PER); an averaging window; a maximum data burst volume; a 5QI; allocation and retention priority (APR); a reflective QoS attribute; a guaranteed flow bit rate (GFBR); a maximum flow bit rate (MFBR); or a maximum packet loss rate.

Optionally, the third indication information includes an indication condition, and the indication condition indicates content of a condition on which a historical QoS value and a predicted QoS value satisfy the reporting threshold and/or a condition on which a historical QoS value and a predicted QoS value do not satisfy the reporting threshold. The content includes at least one of: location information where the reporting threshold is met; location information where the reporting threshold is not met; the location information where the reporting threshold is met and the location information where the reporting threshold is not met; time at which the reporting threshold is met; time at which the reporting threshold is not met; or the time at which the reporting threshold is met and the time at which the reporting threshold is not met.

For example, the third indication information indicates the first network element to analyze a condition on which the historical QoS value of the analytics target satisfies the reporting threshold. The first network element can analyze location information where the historical QoS value of the analytics target satisfies the reporting threshold, in case where the content indicated by the indication condition is location information where the reporting threshold is met. The third indication information indicates the first network element to analyze a condition on which the historical QoS value of the analytics target does not satisfy the reporting threshold. The first network element can analyze location information and time at which the historical QoS value of the analytics target does not satisfy the reporting threshold, in case where the content indicated by the indication condition is location information and time at which the reporting threshold is not met. The location information includes a location point, a trajectory, and an area. The time includes a moment and a time period.

The first network element obtains related data via the internal network element of the core network, the external network element of the core network, the OAM, and the like, so as to analyze the QoS of the analytics target corresponding to the external location information. The QoS of the analytics target corresponding to the external location information can be predicted by machine learning algorithms based on statistics for QoS of the analytics target corresponding to the internal location information.

Optionally, after analyzing the QoS of the analytics target corresponding to the external location information, the first network element can notify the QoS analytics result (the analytics reporting) in case where the analyzed QoS does not satisfy the reporting threshold. The first network element can periodically perform a feedback, perform one feedback, or perform multiple feedbacks. After analyzing the QoS of the analytics target corresponding to the external location information, the first network element can also directly and periodically notify the QoS analytics result, perform one feedback, or perform multiple feedbacks.

In case where the first network element notifies the QoS of the analytics target corresponding to the external location information by means of location mapping, the first network element, when notifying the QoS analytics result, can map the internal location information to the external location information again. That is, the internal location information in the QoS analytics result obtained from analytics is mapped to the external location information, so that the QoS of the analytics target corresponding to the external location information can be obtained and sent to the second network element.

As above mentioned, based on the method provided in this embodiment, by means of performing QoS analytics according to the QoS analytics request from the external network element of the core network, the function of providing the QoS analytics for the external network element of the core network can be implemented, which takes into consideration the scenario where the analytics-function consumer is the external network element of the core network. The limitation that the QoS analytics is only used for the internal network element is solved, and the application range of the QoS analytics is expanded.

Figure 5:
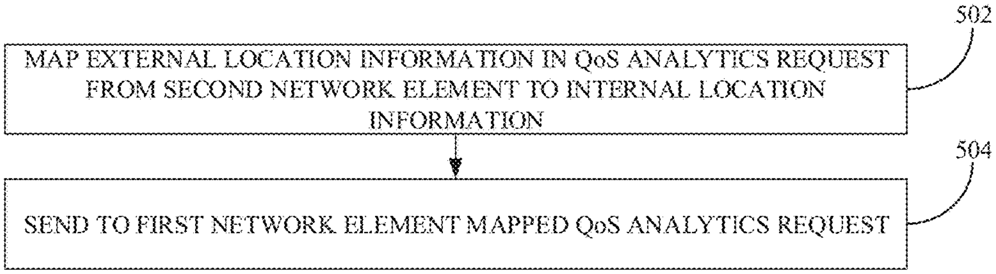
FIG. 5 is a flowchart of a method for QoS analytics provided in an exemplary embodiment of the disclosure.

FIG. 5 illustrates a flowchart of a method for QoS analytics provided in an embodiment of the disclosure. The method is performed by an intermediate network element. The intermediate network element may be a network element of a core network in the communication system illustrated in FIG. 2. The method includes the following.

At 502: external location information in a QoS analytics request from a second network element is mapped to internal location information.

The intermediate network element has capability to map the external location information to the internal location information. Optionally, the intermediate network element is a network element in the 5GS, and the intermediate network element may also be other network elements appearing in the future, such as a network element in other mobile communication systems. The intermediate network element can securely obtain data from an external network element. The external location information is location information determined by the second network element, and the external location information is location information that cannot be identified by the core network. The internal location information is location information used by the core network, and the internal location information is location information that can be identified by the core network. The intermediate network element belongs to the core network, and the second network element does not belong to the core network. Optionally, the external location information includes at least one of: location information determined based on GPS positioning, location information determined based on Wi-Fi positioning, or location information determined based on base station positioning. The external location information includes a location point, an area, or a trajectory, or the like. Optionally, the internal location information includes at least one of: one or more AOIs; one or more TAIs; or one or more cell IDs.

Optionally, the intermediate network element can determine the internal location information corresponding to the external location information based on data indicating a correspondence between the external location information and the internal location information, so that the external location information can be mapped to the internal location information.

At 504: a mapped QoS analytics request is sent to a first network element.

The first network element belongs to the above core network, and the intermediate network element is different from the first network element. The first network element, for example, an NWDAF network element, has data analytics capability. The first network element is configured to notify QoS of an analytics target corresponding to the internal location information according to the mapped QoS analytics request, and the analytics target is indicated by the QoS analytics request. For example, the analytics target may be a service of a target UE. The target UE includes a particular UE, a group of UEs with the same characteristics attributes, or any UE. Optionally, the QoS request further includes analytics-applicable time, where the analytics-applicable time includes a moment or a time period. The analytics-applicable time indicates time used for analyzing QoS. The analytics-applicable time belongs to a historical time period, to a future time period, or to both the historical time period and the future time period. Optionally, the QoS analytics request further includes a reporting threshold, where the reporting threshold is used for triggering to notify a QoS analytics result.

Optionally, the QoS analytics request further contains at least one of: first indication information; second indication information; or third indication information.

The first indication information indicates the first network element to notify a specific value of QoS of the analytics target corresponding to the internal location information. The second indication information indicates the first network element to notify a difference between the reporting threshold and the specific value of the QoS of the analytics target corresponding to the internal location information. The third indication information indicates the first network element to notify at least one of: a condition on which the specific value of the QoS of the analytics target corresponding to the internal location information satisfies the reporting threshold, or a condition on which the specific value of the QoS of the analytics target corresponding to the internal location information does not satisfy the reporting threshold.

Optionally, the QoS analytics request further includes a QoS requirement, the QoS requirement indicates a type of a historical QoS value and a type of a predicted QoS value to be analyzed. The third indication information includes an indication condition, and the indication condition indicates content of a condition on which a historical QoS value and a predicted QoS value satisfy the reporting threshold and/or a condition on which a historical QoS value and a predicted QoS value do not satisfy the reporting threshold.

After analyzing the QoS of the analytics target corresponding to the internal location information, the first network element can send the QoS analytics result to the intermediate network element. The intermediate network element can map the internal location information to the external location information again. That is, the internal location information in the QoS analytics result obtained from analytics is mapped to the external location information, so that the QoS of the analytics target corresponding to the external location information can be obtained and sent to the second network element.

As above mentioned, based on the method provided in this embodiment, by means of mapping the external location information to the internal location information, QoS analytics can be performed based on the external location information, thereby implementing the function of providing the QoS analytics for the external network element of the core network, which takes into consideration the scenario where the analytics-function consumer is the external network element of the core network. The limitation that the QoS analytics is only used for the internal network element is solved, and the application range of the QoS analytics is expanded.

Based on the method provided in embodiments of the disclosure, QoS analytics can be performed directly based on a QoS analytics request that contains external location information. In addition, by mapping the external location information in the QoS analytics request to internal location information, a network element with data analytics capability can perform QoS analytics according to the mapped QoS analytics request. Specifically, there may be the following three cases. (1) An intermediate network element maps the external location information to the internal location information and sends the mapped QoS analytics request to a network element with data analytics capability, so as to perform QoS analytics. (2) The network element with data analytics capability maps the external location information to the internal location information, and performs QoS analytics according to the mapped QoS analytics request. (3) The network element with data analytics capability directly performs QoS analytics based on the QoS analytics request that contains the external location information. Furthermore, the method provided in embodiments of the disclosure also supports QoS analytics performed by the network element with data analytics capability according to the QoS analytics request that contains the internal location information.

According to the above three methods for QoS analytics based on the external location information and according to the case where QoS analytics is performed directly based on the QoS analytics request that contains the internal location information, a procedure for QoS analytics based on the external location information or the internal location information is described in the following four embodiments.

First: For a Case where the QoS Analytics Request Contains the Internal Location Information.

Figure 6:
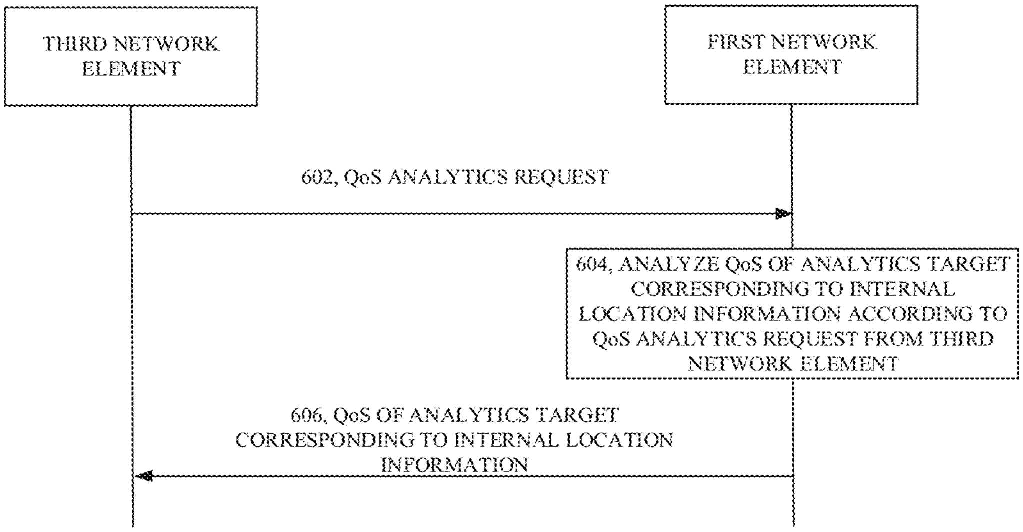
FIG. 6 is a flowchart of a method for QoS analytics provided in an exemplary embodiment of the disclosure.

FIG. 6 illustrates a flowchart of a method for QoS analytics provided in an embodiment of the disclosure. FIG. 6 takes an example for illustration, in which the method is applied to the communication system illustrated in FIG. 2. The method includes the following.

At 602: a third network element sends a QoS analytics request to a first network element.

The first network element has data analytics capability, for example, an NWDAF network element or another intelligent network element capable of performing data analytics and generating an analytics result. The QoS analytics request contains the internal location information. The internal location information is location information used by a core network, i.e., location information that can be identified by the core network, and the first network element and the third network element belong to the core network. The internal location information includes at least one of: one or more AOIs; one or more TAIs; or one or more cell IDs.

The QoS analytics request further contains at least one of: first indication information; second indication information; or third indication information.

The first indication information indicates the first network element to notify a specific value of QoS of an analytics target corresponding to the internal location information. The second indication information indicates the first network element to notify a difference between a reporting threshold and the specific value of the QoS of the analytics target corresponding to the internal location information. The third indication information indicates the first network element to notify at least one of: a condition on which the specific value of the QoS of the analytics target corresponding to the internal location information satisfies the reporting threshold, or a condition on which the specific value of the QoS of the analytics target corresponding to the internal location information does not satisfy the reporting threshold. The analytics target is indicated by the QoS analytics request.

At 604: the first network element analyzes the QoS of the analytics target corresponding to the internal location information according to the QoS analytics request from the third network element.

Optionally, the QoS analytics request further includes analytics-applicable time. The analytics-applicable time belongs to a historical time period or a future time period.

(1) For a case where the QoS analytics request contains the first indication information and the analytics-applicable time belongs to the historical time period.

The first network element can analyze a historical QoS value of the analytics target corresponding to the internal location information and the analytics-applicable time, in case where the QoS analytics request contains the first indication information and the analytics-applicable time belongs to the historical time period.

(2) For a case where the QoS analytics request contains the second indication information and the analytics-applicable time belongs to the historical time period.

Optionally, the QoS analytics request further includes the reporting threshold. The first network element can analyze a difference between the reporting threshold and a historical QoS value of the analytics target corresponding to the internal location information and the analytics-applicable time, in case where the QoS analytics request contains the second indication information and the analytics-applicable time belongs to the historical time period.

(3) For a case where the QoS analytics request contains the third indication information and the analytics-applicable time belongs to the historical time period.

Optionally, the QoS analytics request further includes the reporting threshold. In case where the QoS analytics request contains the third indication information and the analytics-applicable time belongs to the historical time period, the first network element can analyze at least one of: a condition on which a historical QoS value of the analytics target corresponding to the internal location information and the analytics-applicable time satisfies the reporting threshold, or a condition on which the historical QoS value of the analytics target corresponding to the internal location information and the analytics-applicable time does not satisfy the reporting threshold.

(4) For a case where the QoS analytics request contains the first indication information and the analytics-applicable time belongs to the future time period.

The first network element can analyze a predicted QoS value of the analytics target corresponding to the internal location information and the analytics-applicable time, in case where the QoS analytics request contains the first indication information and the analytics-applicable time belongs to the future time period.

(5) For a case where the QoS analytics request contains the second indication information and the analytics-applicable time belongs to the future time period.

Optionally, the QoS analytics request further includes the reporting threshold. The first network element can analyze a change trend of a predicted QoS value of the analytics target corresponding to the internal location information and the analytics-applicable time compared with the reporting threshold, in case where the QoS analytics request contains the second indication information and the analytics-applicable time belongs to the future time period.

(6) For a case where the QoS analytics request contains the third indication information and the analytics-applicable time belongs to the future time period.

Optionally, the QoS analytics request further includes the reporting threshold. In case where the QoS analytics request contains the third indication information and the analytics-applicable time belongs to the future time period, the first network element can analyze at least one of: a condition on which a predicted QoS value of the analytics target corresponding to the internal location information and the analytics-applicable time satisfies the reporting threshold, or a condition on which the predicted QoS value of the analytics target corresponding to the internal location information and the analytics-applicable time does not satisfy the reporting threshold.

When predicting QoS, the first network element can further analyze confidence of QoS predictions.

Optionally, the QoS analytics request further includes a QoS requirement, the QoS requirement indicates a type of a historical QoS value and a type of a predicted QoS value to be analyzed, and the type includes at least one of: a resource type; a priority level; a PDB; a PER; an averaging window; a maximum data burst volume; a 5QI; APR; a reflective QoS attribute; a GFBR; an MFBR; or a maximum packet loss rate.

Optionally, the third indication information includes an indication condition, and the indication condition reflects content of a condition on which a historical QoS value and a predicted QoS value satisfy the reporting threshold and/or a condition on which a historical QoS value and a predicted QoS value do not satisfy the reporting threshold. The content includes at least one of: location information where the reporting threshold is met; location information where the reporting threshold is not met; the location information where the reporting threshold is met and the location information where the reporting threshold is not met; time at which the reporting threshold is met; time at which the reporting threshold is not met; or the time at which the reporting threshold is met and the time at which the reporting threshold is not met.

For example, the third indication information indicates the first network element to analyze a condition on which the historical QoS value of the analytics target satisfies the reporting threshold. The first network element can analyze location information where the historical QoS value of the analytics target satisfies the reporting threshold, in case where the content indicated by the indication condition is location information where the reporting threshold is met. The third indication information indicates the first network element to analyze a condition on which the historical QoS value of the analytics target does not satisfy the reporting threshold. The first network element can analyze location information and time at which the historical QoS value of the analytics target does not satisfy the reporting threshold, in case where the content indicated by the indication condition is location information and time at which the reporting threshold is not met. The location information includes a location point, a trajectory, and an area. The time includes a moment and a time period.

The first network element obtains related data via an internal network element of the core network, an external network element of the core network, OAM, and the like, so as to analyze the QoS of the analytics target corresponding to the internal location information. The QoS of the analytics target corresponding to the internal location information can be predicted by machine learning algorithms based on statistics for QoS of the analytics target corresponding to the internal location information.

At 606: the first network element notifies to the third network element the QoS of the analytics target corresponding to the internal location information.

Optionally, after analyzing the QoS of the analytics target corresponding to the internal location information, the first network element can notify the QoS analytics result (the analytics reporting) in case where the analyzed QoS does not satisfy the reporting threshold. The first network element can periodically perform a feedback, perform one feedback, or perform multiple feedbacks. After analyzing the QoS of the analytics target corresponding to the internal location information, the first network element can also directly and periodically notify the QoS analytics result, perform one feedback, or perform multiple feedbacks. The first network element can notify to the third network element the QoS of the analytics target corresponding to the internal location information.

Figure 7:
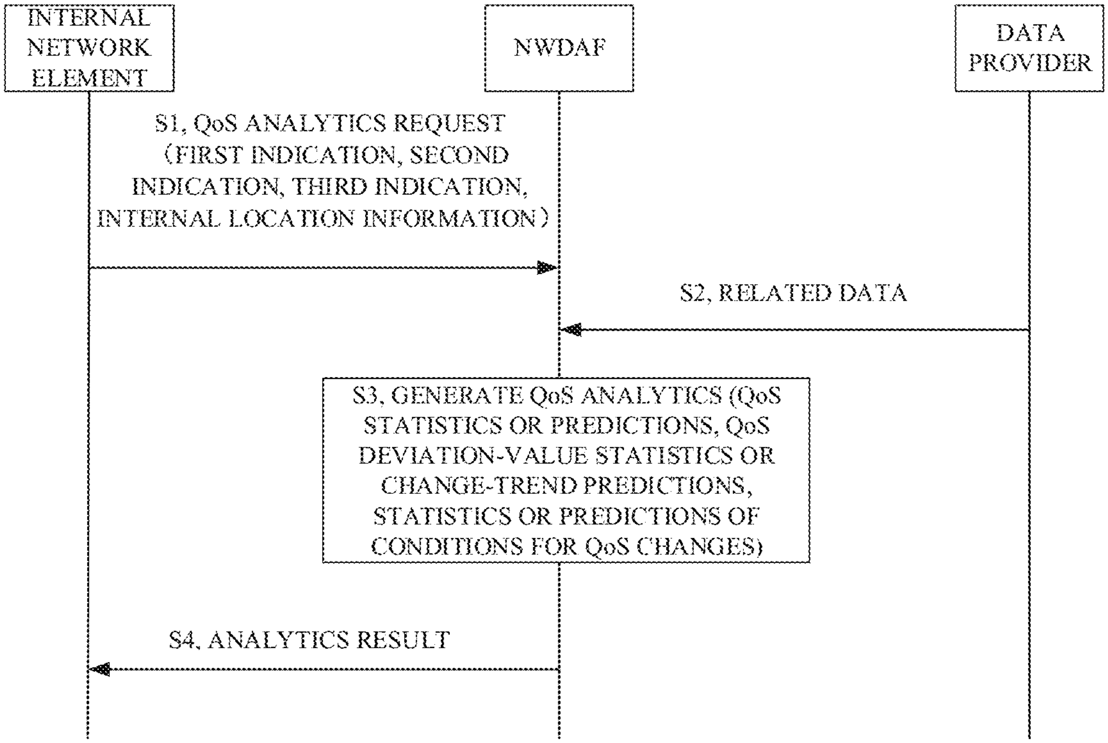
FIG. 7 is a schematic diagram illustrating a procedure for analyzing QoS of an analytics target provided in an exemplary embodiment of the disclosure.

Exemplarily, FIG. 7 is a schematic diagram illustrating a procedure for analyzing QoS of an analytics target provided in an exemplary embodiment of the disclosure. As illustrated in FIG. 7, at S1, an analytics-function consumer (an internal network element) initiates a "QoS sustainability" analytics request to the selected NWDAF. The analytics request includes: an analytics ID, an analytics target, analytics-applicable time, internal location information, related data of the analytics target in an applicable area that the NWDAF needs to collect, a QoS requirement, a reporting threshold, first indication information, second indication information, third indication information, and other analytics filter information. At S2, the NWDAF directly requests data from a data provider. According to the received analytics request, the NWDAF searches for the data provider that stores related data of "QoS sustainability", and requests from the data provider the data, adapted to the QoS requirement and other filter information, of the analytics target in an internal area within applicable time. At S3, the NWDAF generates "QoS sustainability" analytics of the analytics request. In case where the applicable time in the analytics request is in the past, then the NWDAF will generate statistical information where QoS of the analytics target in the internal area with the past applicable time satisfies the reporting threshold. In case where the applicable time in the analytics request is in the future, then the NWDAF will generate prediction information where QoS of the analytics target in the internal area within the future applicable time satisfies the reporting threshold. At S4, the NWDAF delivers the "QoS sustainability" analytics to the analytics-function consumer. The NWDAF delivers the analytics result to the analytics-function consumer either at once or periodically according to a request mode (for example, a feedback that the reporting threshold is not met).

As above mentioned, based on the method provided in this embodiment, analyzing a specific value of the QoS of the analytics target and its variation compared with the reporting threshold helps increase the reliability of the predicted QoS result. The content of the QoS analytics reporting is enriched with respect to the statistical output of a historical QoS value, the level of QoS deviation from the reporting threshold, and a condition for QoS change, as well as with respect to the prediction output of a predicted QoS value, a QoS change trend, and a condition for QoS change. This helps the analytics-function consumer to better determine the QoS change of the analytics target in a certain area over a certain time period, so as to develop a corresponding strategy to provide high-QoS services for the analytics target in a sustainable and stable manner.

Second: for a case where the QoS analytics request contains the external location information and location information is mapped by the intermediate network element.

Figure 8:
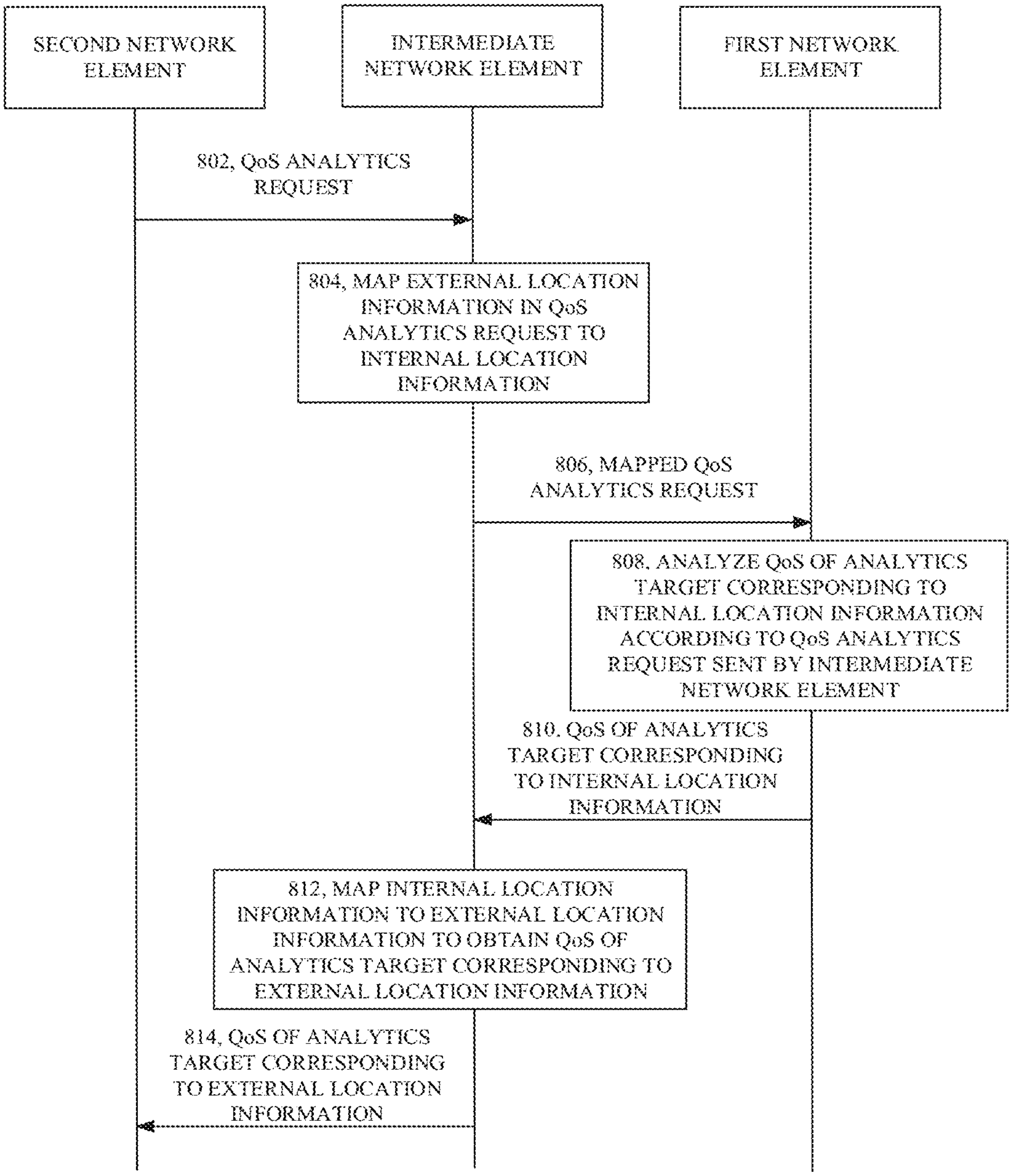
FIG. 8 is a flowchart of a method for QoS analytics provided in an exemplary embodiment of the disclosure.

FIG. 8 illustrates a flowchart of a method for QoS analytics provided in an embodiment of the disclosure. FIG. 8 takes an example for illustration, in which the method is applied to the communication system illustrated in FIG. 2. The method includes the following.

At 802: a second network element sends a QoS analytics request to an intermediate network element.

The QoS analytics request contains external location information. The external location information is location information determined by the second network element. The external location information is location information that cannot be identified by a core network, the intermediate network element belongs to the core network, and the second network element does not belong to the core network. Optionally, the external location information includes at least one of: location information determined based on GPS positioning; location information determined based on Wi-Fi positioning; or location information determined based on base station positioning.

At 804: the intermediate network element maps external location information in the QoS analytics request to internal location information.

The intermediate network element has capability to map the external location information to the internal location information. The internal location information is location information used by the core network, and the internal location information is location information that can be identified by the core network. Optionally, the intermediate network element can determine the internal location information corresponding to the external location information based on data indicating a correspondence between the external location information and the internal location information, so that the external location information can be mapped to the internal location information. Optionally, the internal location information includes at least one of: one or more AOIs; one or more TAIs; or one or more cell IDs.

Optionally, the QoS analytics request further contains at least one of: first indication information; second indication information; or third indication information.

The first indication information indicates the first network element to notify a specific value of QoS of an analytics target corresponding to the internal location information. The second indication information indicates the first network element to notify a difference between a reporting threshold and the specific value of the QoS of the analytics target corresponding to the internal location information. The third indication information indicates the first network element to notify at least one of: a condition on which the specific value of the QoS of the analytics target corresponding to the internal location information satisfies the reporting threshold, or a condition on which the specific value of the QoS of the analytics target corresponding to the internal location information does not satisfy the reporting threshold. The analytics target, for example, a service of a target UE, is indicated by the QoS analytics request. The first network element belongs to the above core network, and the intermediate network element is different from the first network element. The first network element, for example, an NWDAF network element, has data analytics capability.

At 806: the intermediate network element sends to the first network element the mapped QoS analytics request.

Compared with the external location information in a pre-mapped QoS analytics request, the external location information in the mapped QoS request can be mapped to the internal location information, and other information in the QoS analytics request remains unchanged.

At 808: the first network element analyzes the QoS of the analytics target corresponding to the internal location information according to the QoS analytics request sent by the intermediate network element.

Optionally, the QoS analytics request further includes analytics-applicable time. The analytics-applicable time belongs to a historical time period or a future time period.

(1) For a case where the QoS analytics request contains the first indication information and the analytics-applicable time belongs to the historical time period.

The first network element can analyze a historical QoS value of the analytics target corresponding to the internal location information and the analytics-applicable time, in case where the QoS analytics request contains the first indication information and the analytics-applicable time belongs to the historical time period.

(2) For a case where the QoS analytics request contains the second indication information and the analytics-applicable time belongs to the historical time period.

Optionally, the QoS analytics request further includes the reporting threshold. The first network element can analyze a difference between the reporting threshold and a historical QoS value of the analytics target corresponding to the internal location information and the analytics-applicable time, in case where the QoS analytics request contains the second indication information and the analytics-applicable time belongs to the historical time period.

(3) For a case where the QoS analytics request contains the third indication information and the analytics-applicable time belongs to the historical time period.

Optionally, the QoS analytics request further includes the reporting threshold. In case where the QoS analytics request contains the third indication information and the analytics-applicable time belongs to the historical time period, the first network element can analyze at least one of: a condition on which a historical QoS value of the analytics target corresponding to the internal location information and the analytics-applicable time satisfies the reporting threshold, or a condition on which the historical QoS value of the analytics target corresponding to the internal location information and the analytics-applicable time does not satisfy the reporting threshold.

(4) For a case where the QoS analytics request contains the first indication information and the analytics-applicable time belongs to the future time period.

The first network element can analyze a predicted QoS value of the analytics target corresponding to the internal location information and the analytics-applicable time, in case where the QoS analytics request contains the first indication information and the analytics-applicable time belongs to the future time period.

(5) For a case where the QoS analytics request contains the second indication information and the analytics-applicable time belongs to the future time period.

Optionally, the QoS analytics request further includes the reporting threshold. The first network element can analyze a change trend of a predicted QoS value of the analytics target corresponding to the internal location information and the analytics-applicable time compared with the reporting threshold, in case where the QoS analytics request contains the second indication information and the analytics-applicable time belongs to the future time period.

(6) For a case where the QoS analytics request contains the third indication information and the analytics-applicable time belongs to the future time period.

Optionally, the QoS analytics request further includes the reporting threshold. In case where the QoS analytics request contains the third indication information and the analytics-applicable time belongs to the future time period, the first network element can analyze at least one of: a condition on which a predicted QoS value of the analytics target corresponding to the internal location information and the analytics-applicable time satisfies the reporting threshold, or a condition on which the predicted QoS value of the analytics target corresponding to the internal location information and the analytics-applicable time does not satisfy the reporting threshold.

Optionally, the QoS analytics request further includes a QoS requirement, the QoS requirement indicates a type of a historical QoS value and a type of a predicted QoS value to be analyzed, and the type includes at least one of: a resource type; a priority level; a PDB; a PER; an averaging window;

a maximum data burst volume; a 5QI; APR; a reflective QoS attribute; a GFBR; an MFBR; or a maximum packet loss rate.

Optionally, the third indication information includes an indication condition, and the indication condition reflects content of a condition on which a historical QoS value and a predicted QoS value satisfy the reporting threshold and/or a condition on which a historical QoS value and a predicted QoS value do not satisfy the reporting threshold. The content includes at least one of: location information where the reporting threshold is met; location information where the reporting threshold is not met; the location information where the reporting threshold is met and the location information where the reporting threshold is not met; time at which the reporting threshold is met; time at which the reporting threshold is not met; or the time at which the reporting threshold is met and the time at which the reporting threshold is not met.

For example, the third indication information indicates the first network element to analyze a condition on which the historical QoS value of the analytics target satisfies the reporting threshold. The first network element can analyze location information where the historical QoS value of the analytics target satisfies the reporting threshold, in case where the content indicated by the indication condition is location information where the reporting threshold is met. The third indication information indicates the first network element to analyze a condition on which the historical QoS value of the analytics target does not satisfy the reporting threshold. The first network element can analyze location information and time at which the historical QoS value of the analytics target does not satisfy the reporting threshold, in case where the content indicated by the indication condition is location information and time at which the reporting threshold is not met. The location information includes a location point, a trajectory, and an area. The time includes a moment and a time period.

The first network element obtains related data via an internal network element of the core network, an external network element of the core network, OAM, and the like, so as to analyze the QoS of the analytics target corresponding to the internal location information. The QoS of the analytics target corresponding to the internal location information can be predicted by machine learning algorithms based on statistics for QoS of the analytics target corresponding to the internal location information.

At 810: the first network element notifies to the intermediate network element the QoS of the analytics target corresponding to the internal location information.

Optionally, after analyzing the QoS of the analytics target corresponding to the internal location information, the first network element can notify the QoS analytics result (the analytics reporting) in case where the analyzed QoS does not satisfy the reporting threshold. The first network element can periodically perform a feedback, perform one feedback, or perform multiple feedbacks. After analyzing the QoS of the analytics target corresponding to the internal location information, the first network element can also directly and periodically notify the QoS analytics result, perform one feedback, or perform multiple feedbacks. The first network element can notify to the intermediate network element the QoS of the analytics target corresponding to the internal location information.

At 812: the intermediate network element maps the internal location information to the external location information to obtain QoS of the analytics target corresponding to the external location information.

The intermediate network element maps the internal location information to the external location information, i.e., the internal location information in the QoS analytics result obtained by the first network element is mapped to the external location information. Therefore, the QoS of the analytics target corresponding to the external location information can be obtained.

At 814: the intermediate network element notifies to the second network element the QoS of the analytics target corresponding to the external location information.

Figure 9:
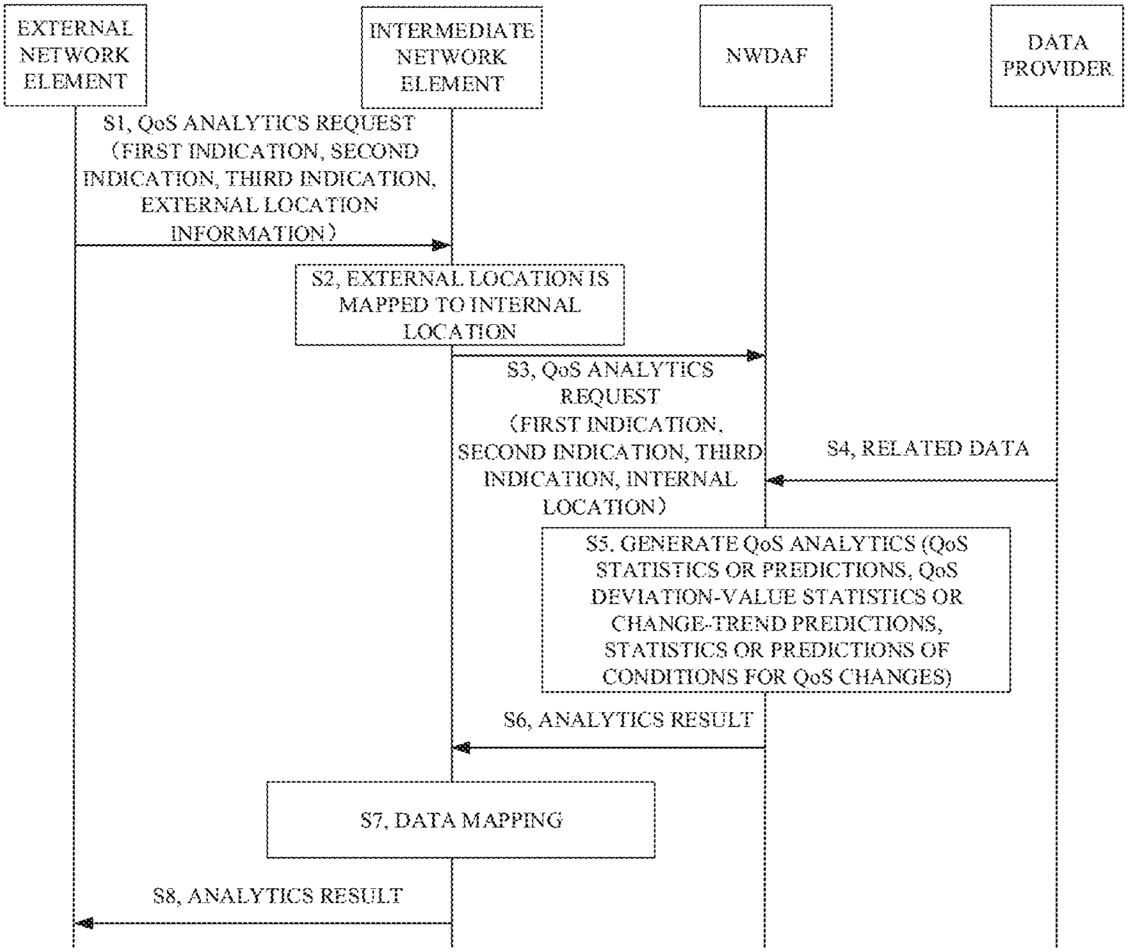
FIG. 9 is a schematic diagram illustrating a procedure for analyzing QoS of an analytics target provided in an exemplary embodiment of the disclosure.

Exemplarily, FIG. 9 is a schematic diagram illustrating a procedure for analyzing QoS of an analytics target provided in an exemplary embodiment of the disclosure. As illustrated in FIG. 9, at S1, an analytics-function consumer (an external network element) initiates a "QoS sustainability" analytics request to the selected NWDAF, and sends the analytics request to the intermediate network element. The analytics request includes: an analytics ID, an analytics target, analytics-applicable time, external location information, related data of the analytics target in an applicable area that the NWDAF needs to collect, a QoS requirement, a reporting threshold, first indication information, second indication information, third indication information, and other analytics filter information. At S2, the intermediate network element maps the external location information to the internal location information. At S3, the intermediate network element forwards to the NWDAF the mapped analytics request. At S4, the NWDAF directly requests data from a data provider. According to the received analytics request, the NWDAF searches for the data provider that stores related data of "QoS sustainability", and requests from the data provider the data, adapted to the QoS requirement and other filter information, of the analytics target in an internal area within applicable time. At S5, the NWDAF generates "QoS sustainability" analytics of the analytics request. In case where the applicable time in the analytics request is in the past, then the NWDAF will generate statistical information where QoS of the analytics target in the internal area within the past applicable time satisfies the reporting threshold. In case where the applicable time in the analytics request is in the future, then the NWDAF will generate prediction information where QoS of the analytics target in the internal area within the future applicable time satisfies the reporting threshold. At S6, the NWDAF delivers the "QoS sustainability" analytics to the intermediate network element. The NWDAF delivers the analytics result to the intermediate network element either at once or periodically according to a request mode (for example, a feedback that the reporting threshold is not met). At S7, the intermediate network element maps the internal location information to the external location information. At S8, the intermediate network element delivers the "QoS sustainability" analytics to the analytics-function consumer. The intermediate network element delivers the analytics result to the analytics-function consumer either at once or periodically according to a request mode (for example, a feedback that the reporting threshold is not met).

As above mentioned, based on the method provided in this embodiment, by means of mapping the external location information to the internal location information, QoS analytics can be performed based on the external location information, thereby implementing the function of providing the QoS analytics for the external network element of the core network, which takes into consideration the scenario where the analytics-function consumer is the external network element of the core network. The limitation that the QoS analytics is only used for the internal network element is solved, and the application range of the QoS analytics is expanded.

In addition, analyzing a specific value of the QoS of the analytics target and its variation compared with the reporting threshold helps increase the reliability of the predicted QoS result. The content of the QoS analytics reporting is enriched with respect to the statistical output of a historical QoS value, the level of QoS deviation from the reporting threshold, and a condition for QoS change, as well as with respect to the prediction output of a predicted QoS value, a QoS change trend, and a condition for QoS change. This helps the analytics-function consumer to better determine the QoS change of the analytics target in a certain area over a certain time period, so as to develop a corresponding strategy to provide high-QoS services for the analytics target in a sustainable and stable manner.

Third: for a case where the QoS analytics request contains the external location information and location information is mapped by the first network element.

Figure 10:
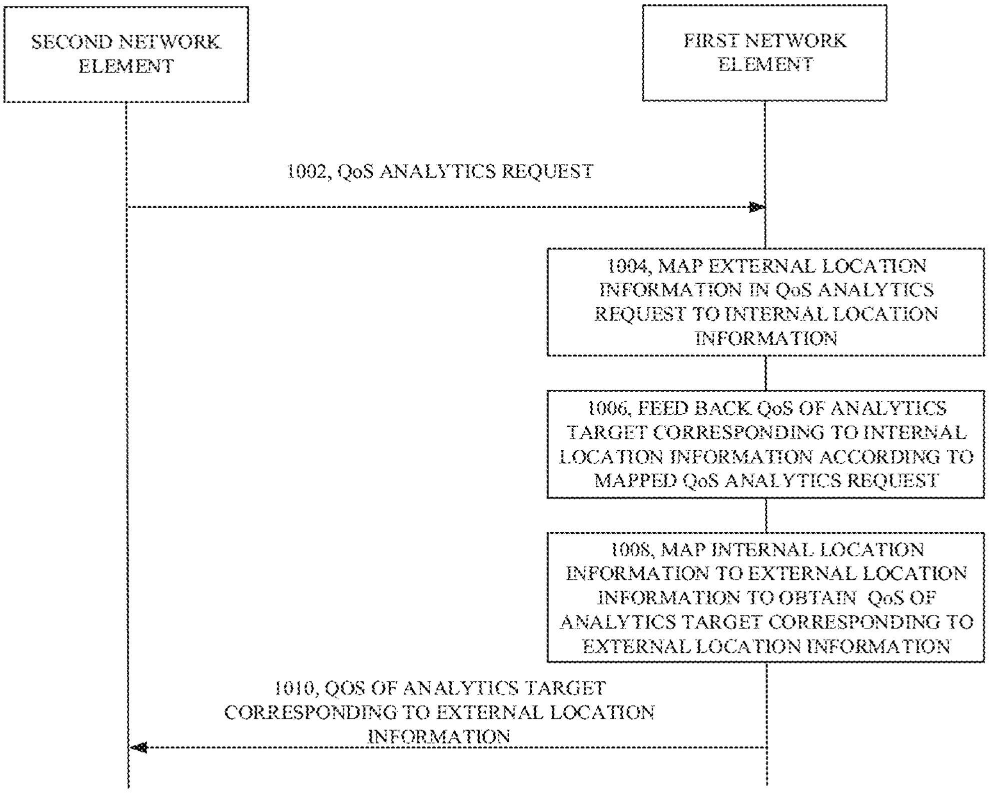
FIG. 10 is a flowchart of a method for QoS analytics provided in an exemplary embodiment of the disclosure.

FIG. 10 illustrates a flowchart of a method for QoS analytics provided in an embodiment of the disclosure. FIG. 10 takes an example for illustration, in which the method is applied to the communication system illustrated in FIG. 2. The method includes the following.

At 1002: a second network element sends a QoS analytics request to a first network element.

The first network element has data analytics capability, for example, an NWDAF network element or another intelligent network element capable of performing data analytics and generating an analytics result. The first network element is a network element in a core network, and the first network element belongs to the core network. The second network element does not belong to the core network, and the second network element is an external network element of the core network. The QoS analytics request contains external location information. The external location information is location information determined by the second network element. The external location information is location information that cannot be identified by the core network, i.e., location information that cannot be identified by the first network element.

At 1004: the first network element maps external location information in the QoS analytics request to internal location information.

The internal location information is location information used by the core network. The internal location information is location information that can be identified by the core network, i.e., location information that can be identified by the first network element. Optionally, the external location information includes at least one of: location information determined based on GPS positioning; location information determined based on Wi-Fi positioning; or location information determined based on base station positioning.

The external location information includes a location point, an area, or a trajectory, or the like. Optionally, the internal location information includes at least one of: one or more AOIs; one or more TAIs; or one or more cell IDs.

When receiving the QoS analytics request sent by the second network element, the first network element can determine whether location information in the QoS analytics request is location information that can be identified by the core network. In case where the location information is location information that cannot be identified by the core network, the first network element can map the location information that cannot be identified by the core network to the location information that can be identified by the core network, that is, map the external location information to the internal location information.

Optionally, the first network element has capability to map the external location information to the internal location information. The first network element directly maps the external location information to the internal location information. Alternatively, the first network element maps the external location information to the internal location information via a mapping module, where the mapping module is an internal module of the first network element. Optionally, the first network element can determine the internal location information corresponding to the external location information based on data indicating a correspondence between the external location information and the internal location information, so that the external location information can be mapped to the internal location information.

Optionally, the QoS analytics request further contains at least one of: first indication information; second indication information; or third indication information.

The first indication information indicates the first network element to notify a specific value of QoS of an analytics target corresponding to the internal location information. The second indication information indicates the first network element to notify a difference between a reporting threshold and the specific value of the QoS of the analytics target corresponding to the internal location information. The third indication information indicates the first network element to notify at least one of: a condition on which the specific value of the QoS of the analytics target corresponding to the internal location information satisfies the reporting threshold, or a condition on which the specific value of the QoS of the analytics target corresponding to the internal location information does not satisfy the reporting threshold. The analytics target is indicated by the QoS analytics request.

At 1006: the first network element notifies the QoS of the analytics target corresponding to the internal location information according to the mapped QoS analytics request.

Optionally, the QoS analytics request further includes analytics-applicable time. The analytics-applicable time belongs to a historical time period or a future time period.

(1) For a case where the QoS analytics request contains the first indication information and the analytics-applicable time belongs to the historical time period.

The first network element can analyze a historical QoS value of the analytics target corresponding to the internal location information and the analytics-applicable time, in case where the QoS analytics request contains the first indication information and the analytics-applicable time belongs to the historical time period.

(2) For a case where the QoS analytics request contains the second indication information and the analytics-applicable time belongs to the historical time period.

Optionally, the QoS analytics request further includes the reporting threshold. The first network element can analyze a difference between the reporting threshold and a historical QoS value of the analytics target corresponding to the internal location information and the analytics-applicable time, in case where the QoS analytics request contains the second indication information and the analytics-applicable time belongs to the historical time period.

(3) For a case where the QoS analytics request contains the third indication information and the analytics-applicable time belongs to the historical time period.

Optionally, the QoS analytics request further includes the reporting threshold. In case where the QoS analytics request contains the third indication information and the analytics-applicable time belongs to the historical time period, the first network element can analyze at least one of: a condition on which a historical QoS value of the analytics target corresponding to the internal location information and the analytics-applicable time satisfies the reporting threshold, or a condition on which the historical QoS value of the analytics target corresponding to the internal location information and the analytics-applicable time does not satisfy the reporting threshold.

(4) For a case where the QoS analytics request contains the first indication information and the analytics-applicable time belongs to the future time period.

The first network element can analyze a predicted QoS value of the analytics target corresponding to the internal location information and the analytics-applicable time, in case where the QoS analytics request contains the first indication information and the analytics-applicable time belongs to the future time period.

(5) For a case where the QoS analytics request contains the second indication information and the analytics-applicable time belongs to the future time period.

Optionally, the QoS analytics request further includes the reporting threshold. The first network element can analyze a change trend of a predicted QoS value of the analytics target corresponding to the internal location information and the analytics-applicable time compared with the reporting threshold, in case where the QoS analytics request contains the second indication information and the analytics-applicable time belongs to the future time period.

(6) For a case where the QoS analytics request contains the third indication information and the analytics-applicable time belongs to the future time period.

Optionally, the QoS analytics request further includes the reporting threshold. In case where the QoS analytics request contains the third indication information and the analytics-applicable time belongs to the future time period, the first network element can analyze at least one of: a condition on which a predicted QoS value of the analytics target corresponding to the internal location information and the analytics-applicable time satisfies the reporting threshold, or a condition on which the predicted QoS value of the analytics target corresponding to the internal location information and the analytics-applicable time does not satisfy the reporting threshold.

Optionally, the QoS analytics request further includes a QoS requirement, the QoS requirement indicates a type of a historical QoS value and a type of a predicted QoS value to be analyzed, and the type includes at least one of: a resource type; a priority level; a PDB; a PER; an averaging window; a maximum data burst volume; a 5QI; APR; a reflective QoS attribute; a GFBR; an MFBR; or a maximum packet loss rate.

Optionally, the third indication information includes an indication condition, and the indication condition reflects content of a condition on which a historical QoS value and a predicted QoS value satisfy the reporting threshold and/or a condition on which a historical QoS value and a predicted QoS value do not satisfy the reporting threshold. The content includes at least one of: location information where the reporting threshold is met; location information where the reporting threshold is not met; the location information where the reporting threshold is met and the location information where the reporting threshold is not met; time at which the reporting threshold is met; time at which the reporting threshold is not met; or the time at which the reporting threshold is met and the time at which the reporting threshold is not met.

For example, the third indication information indicates the first network element to analyze a condition on which the historical QoS value of the analytics target satisfies the reporting threshold. The first network element can analyze location information where the historical QoS value of the analytics target satisfies the reporting threshold, in case where the content indicated by the indication condition is location information where the reporting threshold is met. The third indication information indicates the first network element to analyze a condition on which the historical QoS value of the analytics target does not satisfy the reporting threshold. The first network element can analyze location information and time at which the historical QoS value of the analytics target does not satisfy the reporting threshold, in case where the content indicated by the indication condition is location information and time at which the reporting threshold is not met. The location information includes a location point, a trajectory, and an area. The time includes a moment and a time period.

The first network element obtains related data via an internal network element of the core network, an external network element of the core network, OAM, and the like, so as to analyze the QoS of the analytics target corresponding to the internal location information. The QoS of the analytics target corresponding to the internal location information can be predicted by machine learning algorithms based on statistics for QoS of the analytics target corresponding to the internal location information.

At 1008: the first network element maps the internal location information to the external location information to obtain QoS of the analytics target corresponding to the external location information.

The first network element maps the internal location information to the external location information, i.e., the internal location information in the QoS analytics result obtained by the first network element is mapped to the external location information. Therefore, the QoS of the analytics target corresponding to the external location information can be obtained.

At 1010: the first network element notifies to the second network element the QoS of the analytics target corresponding to the external location information.

Optionally, after analyzing the QoS of the analytics target corresponding to the internal location information, the first network element can notify the QoS analytics result (the analytics reporting) in case where the analyzed QoS does not satisfy the reporting threshold. The first network element can periodically perform a feedback, perform one feedback, or perform multiple feedbacks. After analyzing the QoS of the analytics target corresponding to the internal location information, the first network element can also directly and periodically notify the QoS analytics result, perform one feedback, or perform multiple feedbacks. The first network element can send to the second network element the QoS of the analytics target corresponding to the internal location information.

Figure 11:
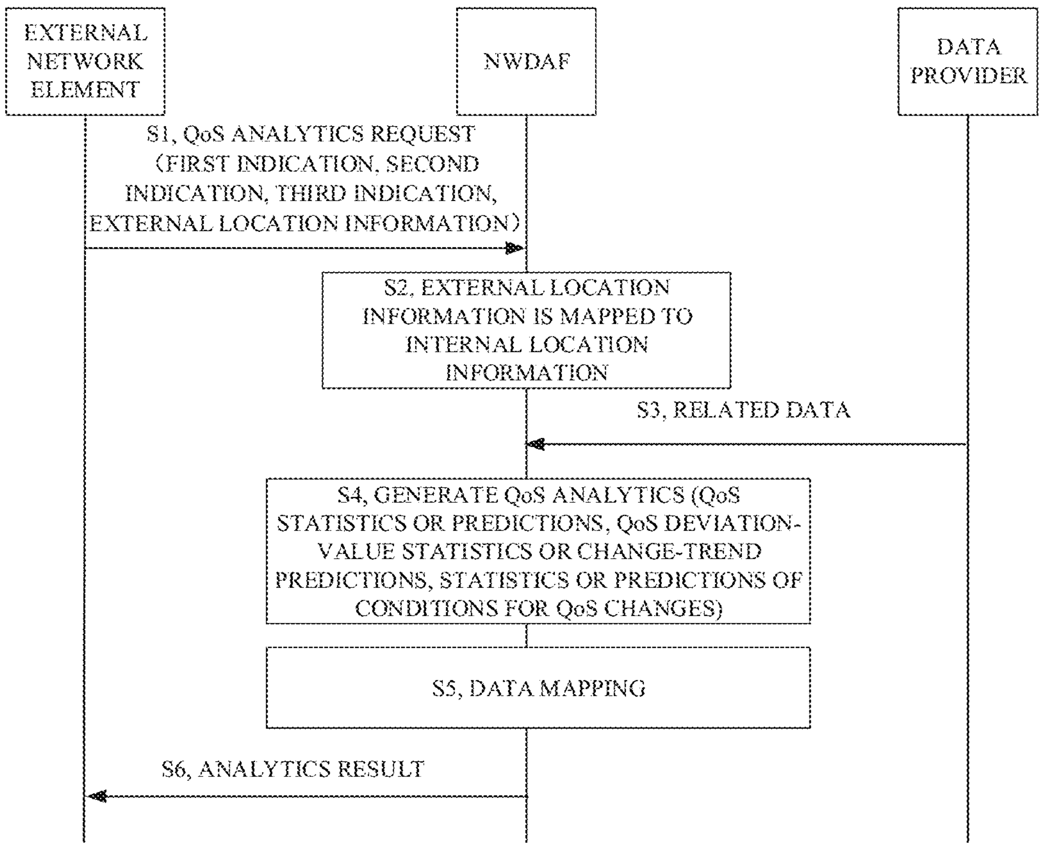
FIG. 11 is a schematic diagram illustrating a procedure for analyzing QoS of an analytics target provided in an exemplary embodiment of the disclosure.

Exemplarily, FIG. 11 is a schematic diagram illustrating a procedure for analyzing QoS of an analytics target provided in an exemplary embodiment of the disclosure. As illustrated in FIG. 11, at S1, an analytics-function consumer (an external network element) initiates a "QoS sustainability" analytics request to the selected NWDAF. The analytics request includes: an analytics ID, an analytics target, analytics-applicable time, external location information, related data of the analytics target in an applicable area that the NWDAF needs to collect, a QoS requirement, a reporting threshold, first indication information, second indication information, third indication information, and other analytics filter information. At S2, the NWDAF maps the external location information to the internal location information. At S3, the NWDAF directly requests data from a data provider. According to the received analytics request, the NWDAF searches for the data provider that stores related data of "QoS sustainability", and requests from the data provider the data, adapted to the QoS requirement and other filter information, of the analytics target in an internal area within applicable time. At S4, the NWDAF generates "QoS sustainability" analytics of the analytics request. In case where the applicable time in the analytics request is in the past, then the NWDAF will generate statistical information where QoS of the analytics target in the internal area within the past applicable time satisfies the reporting threshold. In case where the applicable time in the analytics request is in the future, then the NWDAF will generate prediction information where QoS of the analytics target in the internal area within the future applicable time satisfies the reporting threshold. At S5, the NWDAF maps the internal location information to the external location information. At S6, the NWDAF delivers the "QoS sustainability" analytics to the analytics-function consumer. The NWDAF delivers the analytics result to the analytics-function consumer either at once or periodically according to a request mode (for example, a feedback that the reporting threshold is not met).

As above mentioned, based on the method provided in this embodiment, by means of mapping the external location information to the internal location information, QoS analytics can be performed based on the external location information, thereby implementing the function of providing the QoS analytics for the external network element of the core network, which takes into consideration the scenario where the analytics-function consumer is the external network element of the core network. The limitation that the QoS analytics is only used for the internal network element is solved, and the application range of the QoS analytics is expanded.

In addition, analyzing a specific value of the QoS of the analytics target and its variation compared with the reporting threshold helps increase the reliability of the predicted QoS result. The content of the QoS analytics reporting is enriched with respect to the statistical output of a historical QoS value, the level of QoS deviation from the reporting threshold, and a condition for QoS change, as well as with respect to the prediction output of a predicted QoS value, a QoS change trend, and a condition for QoS change. This helps the analytics-function consumer to better determine the QoS change of the analytics target in a certain area over a certain time period, so as to develop a corresponding strategy to provide high-QoS services for the analytics target in a sustainable and stable manner.

Fourth: for a case where the QoS analytics request contains the external location information and QoS analytics is directly performed by the first network element.

Figure 12:
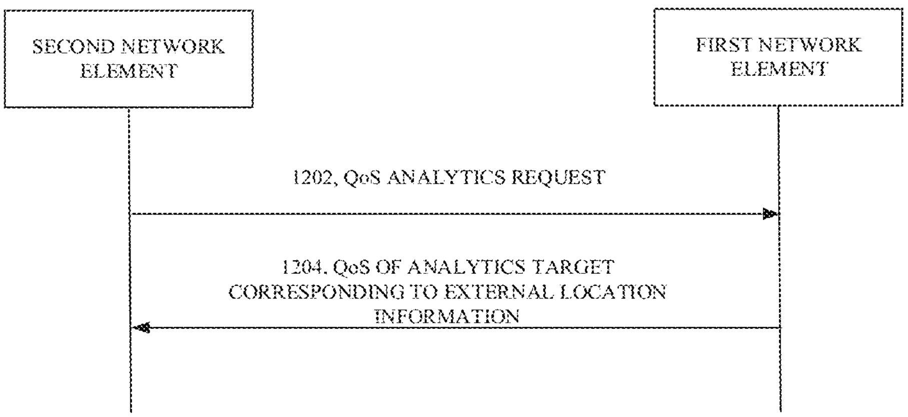
FIG. 12 is a flowchart of a method for QoS analytics provided in an exemplary embodiment of the disclosure.

FIG. 12 illustrates a flowchart of a method for QoS analytics provided in an embodiment of the disclosure. FIG. 12 takes an example for illustration, in which the method is applied to the communication system illustrated in FIG. 2. The method includes the following.

At 1202: a second network element sends a QoS analytics request to a first network element.

The first network element has data analytics capability, for example, an NWDAF network element or another intelligent network element capable of performing data analytics and generating an analytics result. The first network element is a network element in a core network, and the first network element belongs to the core network. The second network element does not belong to the core network, and the second network element is an external network element of the core network. The QoS analytics request contains external location information. The external location information is location information determined by the second network element. The external location information is location information that cannot be identified by the core network, i.e., location information that cannot be identified by the first network element. Optionally, the external location information includes at least one of: location information determined based on GPS positioning; location information determined based on Wi-Fi positioning; or location information determined based on base station positioning.

The external location information includes a location point, an area, or a trajectory, or the like.

Optionally, the QoS analytics request further contains at least one of: first indication information; second indication information; or third indication information.

The first indication information indicates the first network element to notify a specific value of QoS of an analytics target corresponding to the external location information. The second indication information indicates the first network element to notify a difference between a reporting threshold and the specific value of the QoS of the analytics target corresponding to the external location information. The third indication information indicates the first network element to notify at least one of: a condition on which the specific value of the QoS of the analytics target corresponding to the external location information satisfies the reporting threshold, or a condition on which the specific value of the QoS of the analytics target corresponding to the external location information does not satisfy the reporting threshold. The analytics target is indicated by the QoS analytics request.

At 1204: the first network element notifies to the second network element the QoS of the analytics target corresponding to the external location information according to the QoS analytics request.

The first network element can notify to the second network element the QoS of the analytics target corresponding to the external location information according to the above QoS analytics request. The first network element has capability to analyze the QoS of the analytics target corresponding to the external location information. That is, according to the above QoS analytics request, the first network element can directly analyze the QoS of the analytics target corresponding to the external location information and notify to the second network element.

Optionally, the first network element supports identification of the external location information. The first network element can support identification of the external location information through a mapping table between the stored external location information and internal location information, where the internal location information is location information used by the core network. In case where the first network element supports identification of the external location information, the first network element can directly analyze the QoS of the analytics target corresponding to the external location information according to the external location information, so as to notify to the second network element the QoS of the analytics target corresponding to the external location information. For example, the first network element can know a TAI corresponding to the external location information according to the mapping table, and perform QoS analytics on the target object based on the TAI corresponding to the external location information, that is, the first network element can obtain the QoS of the analytics target corresponding to the external location information. Optionally, when receiving the above QoS analytics request, the first network element can obtain from other network elements related data used by the analytics target corresponding to the external location information for QoS analytics. Then the first network element can perform QoS analytics according to the related data obtained, so that the QoS of the analytics target corresponding to the external location information can be obtained. The other network elements may be network elements of the core network where the first network element is located, or external network elements of the core network where the first network element is located.

Optionally, the QoS analytics request further includes analytics-applicable time. The analytics-applicable time belongs to a historical time period or a future time period.

(1) For a case where the QoS analytics request contains the first indication information and the analytics-applicable time belongs to the historical time period.

The first network element can analyze a historical QoS value of the analytics target corresponding to the external location information and the analytics-applicable time, in case where the QoS analytics request contains the first indication information and the analytics-applicable time belongs to the historical time period.

(2) For a case where the QoS analytics request contains the second indication information and the analytics-applicable time belongs to the historical time period.

Optionally, the QoS analytics request further includes the reporting threshold. The first network element can analyze a difference between the reporting threshold and a historical QoS value of the analytics target corresponding to the external location information and the analytics-applicable time, in case where the QoS analytics request contains the second indication information and the analytics-applicable time belongs to the historical time period.

(3) For a case where the QoS analytics request contains the third indication information and the analytics-applicable time belongs to the historical time period.

Optionally, the QoS analytics request further includes the reporting threshold. In case where the QoS analytics request contains the third indication information and the analytics-applicable time belongs to the historical time period, the first network element can analyze at least one of: a condition on which a historical QoS value of the analytics target corresponding to the external location information and the analytics-applicable time satisfies the reporting threshold, or a condition on which the historical QoS value of the analytics target corresponding to the external location information and the analytics-applicable time does not satisfy the reporting threshold.

(4) For a case where the QoS analytics request contains the first indication information and the analytics-applicable time belongs to the future time period.

The first network element can analyze a predicted QoS value of the analytics target corresponding to the external location information and the analytics-applicable time, in case where the QoS analytics request contains the first indication information and the analytics-applicable time belongs to the future time period.

(5) For a case where the QoS analytics request contains the second indication information and the analytics-applicable time belongs to the future time period.

Optionally, the QoS analytics request further includes the reporting threshold. The first network element can analyze a change trend of a predicted QoS value of the analytics target corresponding to the external location information and the analytics-applicable time compared with the reporting threshold, in case where the QoS analytics request contains the second indication information and the analytics-applicable time belongs to the future time period.

(6) For a case where the QoS analytics request contains the third indication information and the analytics-applicable time belongs to the future time period.

Optionally, the QoS analytics request further includes the reporting threshold. In case where the QoS analytics request contains the third indication information and the analytics-applicable time belongs to the future time period, the first network element can analyze at least one of: a condition on which a predicted QoS value of the analytics target corresponding to the external location information and the analytics-applicable time satisfies the reporting threshold, or a condition on which the predicted QoS value of the analytics target corresponding to the external location information and the analytics-applicable time does not satisfy the reporting threshold.

Optionally, the QoS analytics request further includes a QoS requirement, the QoS requirement indicates a type of a historical QoS value and a type of a predicted QoS value to be analyzed, and the type includes at least one of: a resource type; a priority level; a PDB; a PER; an averaging window; a maximum data burst volume; a 5QI; APR; a reflective QoS attribute; a GFBR; an MFBR; or a maximum packet loss rate.

Optionally, the third indication information includes an indication condition, and the indication condition reflects content of a condition on which a historical QoS value and a predicted QoS value satisfy the reporting threshold and/or a condition on which a historical QoS value and a predicted QoS value do not satisfy the reporting threshold. The content includes at least one of: location information where the reporting threshold is met; location information where the reporting threshold is not met; the location information where the reporting threshold is met and the location information where the reporting threshold is not met; time at which the reporting threshold is met; time at which the reporting threshold is not met; or the time at which the reporting threshold is met and the time at which the reporting threshold is not met.

For example, the third indication information indicates the first network element to analyze a condition on which the historical QoS value of the analytics target satisfies the reporting threshold. The first network element can analyze location information where the historical QoS value of the analytics target satisfies the reporting threshold, in case where the content indicated by the indication condition is location information where the reporting threshold is met. The third indication information indicates the first network element to analyze a condition on which the historical QoS value of the analytics target does not satisfy the reporting threshold. The first network element can analyze location information and time at which the historical QoS value of the analytics target does not satisfy the reporting threshold, in case where the content indicated by the indication condition is location information and time at which the reporting threshold is not met. The location information includes a location point, a trajectory, and an area. The time includes a moment and a time period.

The first network element obtains related data via an internal network element of the core network, an external network element of the core network, OAM, and the like, so as to analyze the QoS of the analytics target corresponding to the external location information. The QoS of the analytics target corresponding to the external location information can be predicted by machine learning algorithms based on statistics for QoS of the analytics target corresponding to the external location information.

Optionally, after analyzing the QoS of the analytics target corresponding to the external location information, the first network element can notify the QoS analytics result (the analytics reporting) in case where the analyzed QoS does not satisfy the reporting threshold. The first network element can periodically perform a feedback, perform one feedback, or perform multiple feedbacks. After analyzing the QoS of the analytics target corresponding to the external location information, the first network element can also directly and periodically notify the QoS analytics result, perform one feedback, or perform multiple feedbacks. The first network element can send to the second network element the QoS of the analytics target corresponding to external location information.

Figure 13:
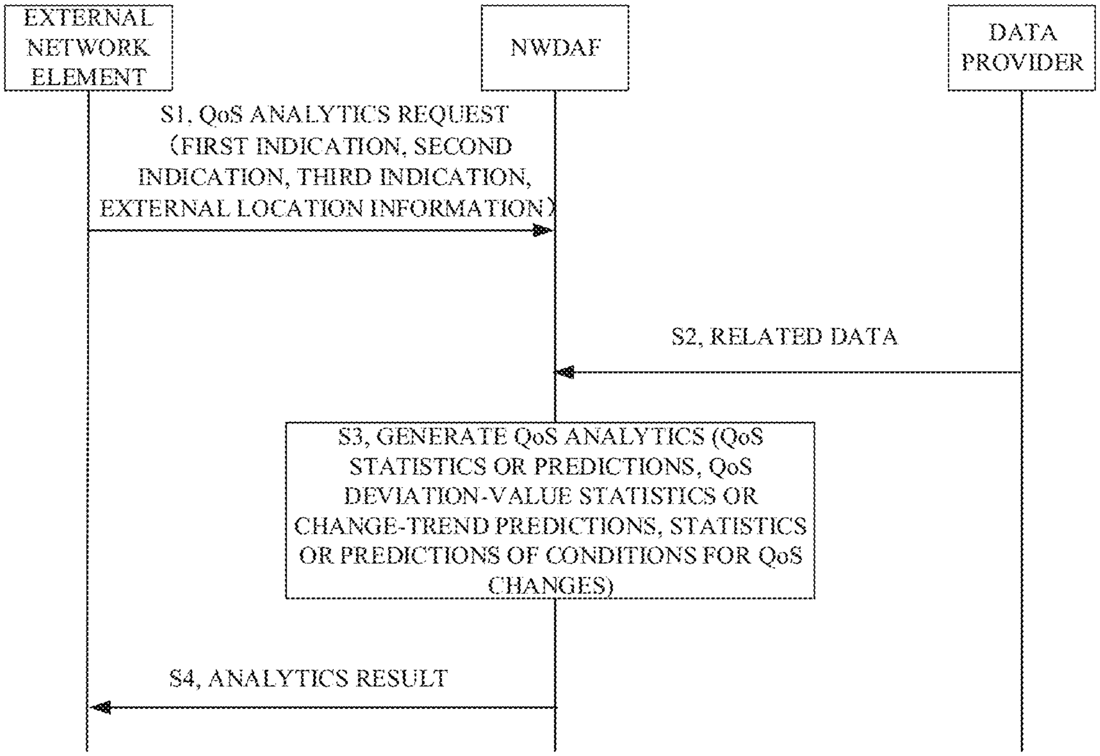
FIG. 13 is a schematic diagram illustrating a procedure for analyzing QoS of an analytics target provided in an exemplary embodiment of the disclosure.

Exemplarily, FIG. 13 is a schematic diagram illustrating a procedure for analyzing QoS of an analytics target provided in an exemplary embodiment of the disclosure. As illustrated in FIG. 13, at S1, an analytics-function consumer (an external network element) initiates a "QoS sustainability" analytics request to a selected NWDAF. The analytics request includes: an analytics ID, an analytics target, analytics-applicable time, external location information, related data of the analytics target in an applicable area that the NWDAF needs to collect, a QoS requirement, a reporting threshold, first indication information, second indication information, third indication information, and other analytics filter information. At S2, the NWDAF directly requests data from a data provider. According to the received analytics request, the NWDAF searches for the data provider that stores related data of "QoS sustainability", and requests from the data provider the data, adapted to the QoS requirement and other filter information, of the analytics target in an internal area within applicable time. At S3, the NWDAF generates "QoS sustainability" analytics of the analytics request. In case where the applicable time in the analytics request is in the past, then the NWDAF will generate statistical information where QoS of the analytics target in the external area within the past applicable time satisfies the reporting threshold. In case where the applicable time in the analytics request is in the future, then the NWDAF will generate prediction information where QoS of the analytics target in the external area within the future applicable time satisfies the reporting threshold. At S4, the NWDAF delivers the "QoS sustainability" analytics to the analytics-function consumer. The NWDAF delivers the analytics result to the analytics-function consumer either at once or periodically according to a request mode (for example, a feedback that the reporting threshold is not met).

As above mentioned, based on the method provided in this embodiment, by means performing QoS analytics based on the external location information, the function of providing the QoS analytics for the external network element of the core network can be implemented, which takes into consideration the scenario where the analytics-function consumer is the external network element of the core network. The limitation that the QoS analytics is only used for the internal network element is solved, and the application range of the QoS analytics is expanded.

In addition, analyzing a specific value of the QoS of the analytics target and its variation compared with the reporting threshold helps increase the reliability of the predicted QoS result. The content of the QoS analytics reporting is enriched with respect to the statistical output of a historical QoS value, the level of QoS deviation from the reporting threshold, and a condition for QoS change, as well as with respect to the prediction output of a predicted QoS value, a QoS change trend, and a condition for QoS change. This helps the analytics-function consumer to better determine the QoS change of the analytics target in a certain area over a certain time period, so as to develop a corresponding strategy to provide high-QoS services for the analytics target in a sustainable and stable manner.

It may be noted that, the method provided in embodiments of the disclosure may further be applicable to other data analytics scenarios similar to QoS analytics. For example, a mechanism for mapping location information may be applicable to the external location information sent by the analytics-function consumer for requesting other types of data analytics. In addition, the mechanism for mapping location information may also be applicable to other types of information mapping, for example, mapping between external temporal information and internal temporal information.

The above embodiments can be implemented separately or in free combination.

Figure 14:
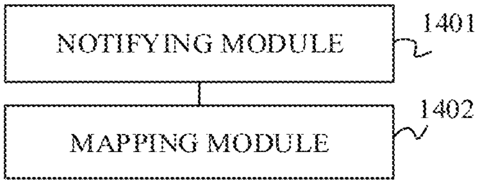
FIG. 14 is a block diagram of an apparatus for QoS analytics provided in an exemplary embodiment of the disclosure.

FIG. 14 illustrates a block diagram of an apparatus for QoS analytics provided in an embodiment of the disclosure. The apparatus has data analytics capability. As illustrated in FIG. 14, the apparatus includes a notifying module 1401. The notifying module 1401 is configured to notify to a second network element QoS of an analytics target according to a QoS analytics request from the second network element. The apparatus is a network element in a core network, the second network element does not belong to the core network, and the analytics target is indicated by the QoS analytics request.

In an optional design, the QoS analytics request contains external location information, and the external location information is location information determined by the second network element. The notifying module 1401 is configured to: notify to the second network element QoS of the analytics target corresponding to the external location information according to the QoS analytics request.

In an optional design, the apparatus has capability to analyze the QoS of the analytics target corresponding to the external location information.

In an optional design, the notifying module 1401 is configured to: map the external location information to internal location information, where the internal location information is location information used by the core network; analyze QoS of the analytics target corresponding to the internal location information according to the mapped QoS analytics request; and notify to the second network element the QoS of the analytics target corresponding to the external location information according to the QoS of the analytics target corresponding to the internal location information.

In an optional design, the notifying module 1401 is configured to: map the external location information to the internal location information via a mapping module 1402. The mapping module 1402 is an internal module of the apparatus.

In an optional design, the notifying module 1401 is configured to: map the internal location information to the external location information to obtain the QoS of the analytics target corresponding to the external location information; and notify to the second network element the QoS of the analytics target corresponding to the external location information.

In an optional design, the external location information includes at least one of: location information determined based on GPS positioning; location information determined based on Wi-Fi positioning; or location information determined based on base station positioning.

In an optional design, the internal location information includes at least one of: one or more AOIs; one or more TAIs; or one or more cell IDs.

In an optional design, the QoS analytics request further contains at least one of: first indication information; second indication information; or third indication information. The first indication information indicates the apparatus to notify a specific value of QoS of the analytics target corresponding to external location information. The second indication information indicates the apparatus to notify a difference between a reporting threshold and the specific value of the QoS of the analytics target corresponding to the external location information. The third indication information indicates the apparatus to notify at least one of: a condition on which the specific value of the QoS of the analytics target corresponding to the external location information satisfies the reporting threshold, or a condition on which the specific value of the QoS of the analytics target corresponding to the external location information does not satisfy the reporting threshold.

In an optional design, the QoS analytics request further includes analytics-applicable time. The notifying module 1401 is configured to: notify to the second network element a historical QoS value of the analytics target corresponding to the external location information and the analytics-applicable time, in case where the QoS analytics request contains the first indication information and the analytics-applicable time belongs to a historical time period.

In an optional design, the QoS analytics request further includes analytics-applicable time and the reporting threshold. The notifying module 1401 is configured to: notify to the second network element a difference between the reporting threshold and a historical QoS value of the analytics target corresponding to the external location information and the analytics-applicable time, in case where the QoS analytics request contains the second indication information and the analytics-applicable time belongs to a historical time period.

In an optional design, the QoS analytics request further includes analytics-applicable time and the reporting threshold. The notifying module 1401 is configured to: in case where the QoS analytics request contains the third indication information and the analytics-applicable time belongs to a historical time period, notify to the second network element at least one of: a condition on which a historical QoS value of the analytics target corresponding to the external location information and the analytics-applicable time satisfies the reporting threshold, or a condition on which the historical QoS value of the analytics target corresponding to the external location information and the analytics-applicable time does not satisfy the reporting threshold.

In an optional design, the QoS analytics request further includes analytics-applicable time. The notifying module 1401 is configured to: notify to the second network element a predicted QoS value of the analytics target corresponding to the external location information and the analytics-applicable time, in case where the QoS analytics request contains the first indication information and the analytics-applicable time belongs to a future time period.

In an optional design, the QoS analytics request further includes analytics-applicable time and the reporting threshold. The notifying module 1401 is configured to: notify to the second network element a change trend of a predicted QoS value of the analytics target corresponding to the external location information and the analytics-applicable time compared with the reporting threshold, in case where the QoS analytics request contains the second indication information and the analytics-applicable time belongs to a future time period.

In an optional design, the QoS analytics request further includes analytics-applicable time and the reporting threshold. The notifying module 1401 is configured to: in case where the QoS analytics request contains the third indication information and the analytics-applicable time belongs to a future time period, notify to the second network element at least one of: a condition on which a predicted QoS value of the analytics target corresponding to the external location information and the analytics-applicable time satisfies the reporting threshold, or a condition on which the predicted QoS value of the analytics target corresponding to the external location information and the analytics-applicable time does not satisfy the reporting threshold.

In an optional design, the QoS analytics request further includes a QoS requirement, the QoS requirement indicates a type of a historical QoS value and a type of a predicted QoS value to be analyzed, and the type includes at least one of: a resource type; a priority level; a PDB; a PER; an averaging window; a maximum data burst volume; a 5QI; ARP; a reflective QoS attribute; a GFBR; an MFBR; or a maximum packet loss rate.

In an optional design, the third indication information includes an indication condition, and the indication condition indicates content of a condition on which a historical QoS value and a predicted QoS value satisfy the reporting threshold and/or a condition on which a historical QoS value and a predicted QoS value do not satisfy the reporting threshold. The content includes at least one of: location information where the reporting threshold is met; location information where the reporting threshold is not met; the location information where the reporting threshold is met and the location information where the reporting threshold is not met; time at which the reporting threshold is met; time at which the reporting threshold is not met; or the time at which the reporting threshold is met and the time at which the reporting threshold is not met.

In an optional design, the apparatus is an NWDAF network element.

Figure 15:
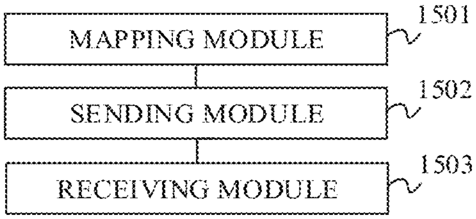
FIG. 15 is a block diagram of an apparatus for QoS analytics provided in an exemplary embodiment of the disclosure.

FIG. 15 illustrates a block diagram of an apparatus for QoS analytics provided in an embodiment of the disclosure. As illustrated in FIG. 15, the apparatus includes: a mapping module 1501 configured to map external location information in a QoS analytics request from a second network element to internal location information; and a sending module 1502 configured to send to a first network element the mapped QoS analytics request. The external location information is location information determined by the second network element, and the internal location information is location information used by a core network. The first network element and the apparatus are network elements in the core network, the second network element does not belong to the core network, and the apparatus is different from the first network element. The first network element has data analytics capability. The first network element is configured to notify QoS of an analytics target corresponding to the internal location information according to the mapped QoS analytics request. The analytics target is indicated by the QoS analytics request.

In an optional design, the apparatus further includes: a receiving module 1503 configured to receive the QoS of the analytics target corresponding to the internal location information notified by the first network element; the mapping module 1501 configured to map the internal location information to the external location information to obtain QoS of the analytics target corresponding to the external location information; and the sending module 1502 configured to notify to the second network element the QoS of the analytics target corresponding to the external location information.

In an optional design, the external location information includes at least one of: location information determined based on GPS positioning; location information determined based on Wi-Fi positioning; or location information determined based on base station positioning.

In an optional design, the internal location information includes at least one of: one or more AOIs; one or more TAIs; or one or more cell IDs.

In an optional design, the QoS analytics request further contains at least one of: first indication information; second indication information; or third indication information. The first indication information indicates the first network element to notify a specific value of the QoS of the analytics target corresponding to the internal location information. The second indication information indicates the first network element to notify a difference between a reporting threshold and the specific value of the QoS of the analytics target corresponding to the internal location information. The third indication information indicates the first network element to notify at least one of: a condition on which the specific value of the QoS of the analytics target corresponding to the internal location information satisfies the reporting threshold, or a condition on which the specific value of the QoS of the analytics target corresponding to the internal location information does not satisfy the reporting threshold.

In an optional design, the QoS analytics request further includes analytics-applicable time. The QoS of the analytics target corresponding to the internal location information includes a historical QoS value of the analytics target corresponding to the internal location information and the analytics-applicable time, in case where the QoS analytics request contains the first indication information and the analytics-applicable time belongs to a historical time period.

In an optional design, the QoS analytics request further includes analytics-applicable time and the reporting threshold. The QoS of the analytics target corresponding to the internal location information includes a difference between the reporting threshold and a historical QoS value of the analytics target corresponding to the internal location information and the analytics-applicable time, in case where the QoS analytics request contains the second indication information and the analytics-applicable time belongs to a historical time period.

In an optional design, the QoS analytics request further includes analytics-applicable time and the reporting threshold. In case where the QoS analytics request contains the third indication information and the analytics-applicable time belongs to a historical time period, the QoS of the analytics target corresponding to the internal location information includes at least one of: a condition on which a historical QoS value of the analytics target corresponding to the internal location information and the analytics-applicable time satisfies the reporting threshold, or a condition on which the historical QoS value of the analytics target corresponding to the internal location information and the analytics-applicable time does not satisfy the reporting threshold.

In an optional design, the QoS analytics request further includes analytics-applicable time. The QoS of the analytics target corresponding to the internal location information includes a predicted QoS value of the analytics target corresponding to the internal location information and the analytics-applicable time, in case where the QoS analytics request contains the first indication information and the analytics-applicable time belongs to a future time period.

In an optional design, the QoS analytics request further includes analytics-applicable time and the reporting threshold. The QoS of the analytics target corresponding to the internal location information includes a change trend of a predicted QoS value of the analytics target corresponding to the internal location information and the analytics-applicable time compared with the reporting threshold, in case where the QoS analytics request contains the second indication information and the analytics-applicable time belongs to a future time period.

In an optional design, the QoS analytics request further includes analytics-applicable time and the reporting threshold. In case where the QoS analytics request contains the third indication information and the analytics-applicable time belongs to a future time period, the QoS of the analytics target corresponding to the internal location information includes at least one of: a condition on which a predicted QoS value of the analytics target corresponding to the internal location information and the analytics-applicable time satisfies the reporting threshold, or a condition on which the predicted QoS value of the analytics target corresponding to the internal location information and the analytics-applicable time does not satisfy the reporting threshold.

In an optional design, the QoS analytics request further includes a QoS requirement, the QoS requirement indicates a type of a historical QoS value and a type of a predicted QoS value to be analyzed, and the type includes at least one of: a resource type; a priority level; a PDB; a PER; an averaging window; a maximum data burst volume; a 5QI; ARP; a reflective QoS attribute; a GFBR; an MFBR; or a maximum packet loss rate.

In an optional design, the third indication information includes an indication condition, and the indication condition indicates content of a condition on which a historical QoS value and a predicted QoS value satisfy the reporting threshold and/or a condition on which a historical QoS value and a predicted QoS value do not satisfy the reporting threshold. The content includes at least one of: location information where the reporting threshold is met; location information where the reporting threshold is not met; the location information where the reporting threshold is met and the location information where the reporting threshold is not met; time at which the reporting threshold is met; time at which the reporting threshold is not met; or the time at which the reporting threshold is met and the time at which the reporting threshold is not met.

In an optional design, the first network element is an NWDAF network element.

It may be noted that, when the apparatus provided in the foregoing embodiments implements its functions, only the division into the above functional modules is taken an example for illustration. In practice, the above functions can be allocated to different functional modules according to actual needs, that is, the structure of the device is divided into different functional modules to complete all or some of the functions described above.

Regarding the apparatus in the foregoing embodiments, the manner in which each module performs operations has been described in detail in the related method embodiments and thus will not be elaborated again herein.

Figure 16:
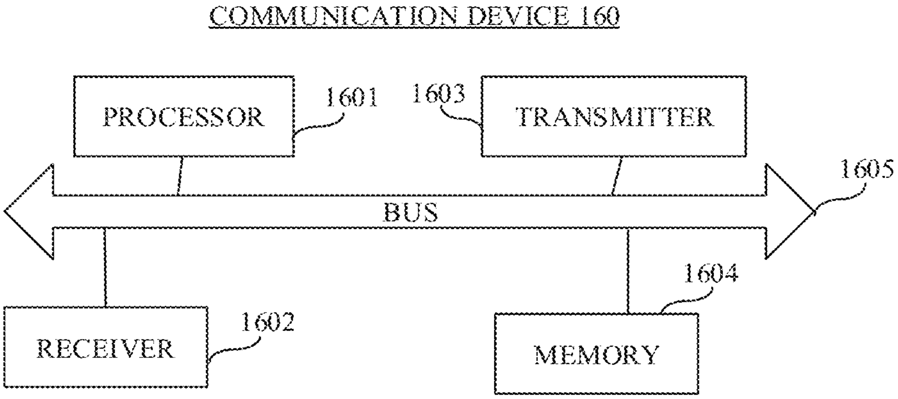
FIG. 16 is a schematic structural diagram of a communication device provided in an exemplary embodiment of the disclosure.

FIG. 16 illustrates a schematic structural diagram of a communication device provided in an exemplary embodiment of the disclosure. The communication device 160 includes a processor 1601, a receiver 1602, a transmitter 1603, a memory 1604, and a bus 1605.

The processor 1601 includes one or more processing cores. The processor 1601 performs various functional applications and information processing by running software programs and modules.

The receiver 1602 and the transmitter 1603 may be implemented as a communication assembly. The communication assembly may be a communication chip.

The memory 1604 is connected with the processor 1601 via the bus 1605.

The memory 1604 may be configured to store at least one instruction, and the processor 1601 is configured to execute the at least one instruction to implement various operations in foregoing method embodiments.

In addition, the memory 1604 may be implemented by any type of volatile or nonvolatile storage devices or combinations thereof. The volatile or non-volatile storage devices include, but are not limited to: a magnetic disk or an optical disk, an electrically erasable programmable read-only memory (EEPROM), an erasable programmable read-only memory (EPROM), a static random-access memory (SRAM), a read-only memory (ROM), a magnetic memory, a flash memory, and a programmable read-only memory (PROM).

When a communication device is implemented as a first network element, a processor and a transceiver in the communication device involved in embodiments of the disclosure can execute the operations performed by the first network element in the method illustrated in any one of the foregoing method embodiments, which will not be repeated herein.

When a communication device is implemented as an intermediate network element, a processor and a transceiver in the communication device involved in embodiments of the disclosure can execute the operations performed by the intermediate network element in the method illustrated in any one of the foregoing method embodiments, which will not be repeated herein.

When a communication device is implemented as a second network element, a processor and a transceiver in the communication device involved in embodiments of the disclosure can execute the operations performed by the second network element in the method illustrated in any one of the foregoing method embodiments, which will not be repeated herein.

When a communication device is implemented as a third network element, a processor and a transceiver in the communication device involved in embodiments of the disclosure can execute the operations performed by the third network element in the method illustrated in any one of the foregoing method embodiments, which will not be repeated herein.

In an exemplary embodiment, a computer-readable storage medium is further provided. The computer-readable storage medium is configured to store at least one instruction, at least one program, a code set, or an instruction set which is loaded and executed by a processor to implement the method for QoS analytics provided in the foregoing method embodiments.

In an exemplary embodiment, a chip is further provided. The chip includes a programmable logic circuit and/or program instructions. The chip, when run on the communication device, is configured to implement the method for QoS analytics provided in the foregoing method embodiments.

In an exemplary embodiment, a computer program product is further provided. The computer program product, when run on a processor of a computer device, is operable with the computer device to perform the foregoing method for QoS analytics.

Those skilled in the art can appreciate that in one or more of the above examples, the functions described in embodiments of the disclosure may be implemented by hardware, software, firmware, or any combination thereof. When implemented by software, the functions may be stored in a computer-readable medium or transmitted as one or more instructions or codes in the computer-readable medium. The computer-readable medium includes a computer storage medium and a communication medium, where the communication medium includes any medium that facilitates transfer of a computer program from one place to another, and the storage medium may be any available medium that can be accessed by a general-purpose computer or a special-purpose computer.

The foregoing elaborations are merely exemplary embodiments of the disclosure, and are not intended for limiting the disclosure. Any modification, equivalent replacement, and improvement made within the concept and principle of the disclosure shall fall within the protection scope of the disclosure.

What is claimed is:

1. A first network element, the first network element having data analytics capability and comprising:

a transceiver;

a memory configured to store executable instructions; and a processor configured to execute the executable instructions stored in the memory to cause the transceiver to:

notify, to a second network element, quality of service (QoS) of an analytics target according to a QoS analytics request from the second network element; wherein the analytics target is indicated by the QoS analytics request;

wherein the QoS analytics request contains external location information, and the external location information is location information determined by the second network element; and in terms of notifying, to the second network element, the QoS of the analytics target according to the QoS analytics request from the second network element, the processor is configured to cause the transceiver to:

notify, to the second network element, QoS of the analytics target corresponding to the external location information according to the QoS analytics request.

2. The first network element of claim 1, wherein the QoS of the analytics target is QoS of terminal.

3. The first network element of claim 1, wherein in term of notifying, to the second network element, the QoS of the analytics target corresponding to the external location information according to the QoS analytics request, the processor is configured to cause the transceiver to:

map the external location information to internal location information, wherein the internal location information is location information used by a core network;

analyze QoS of the analytics target corresponding to the internal location information according to a mapped QoS analytics request; and notify, to the second network element, the QoS of the analytics target corresponding to the external location information according to the QoS of the analytics target corresponding to the internal location information.

4. The first network element of claim 3, wherein the internal location information comprises at least one of:

one or more areas of interest (AOIs);

one or more tracking area identities (TAIs); or one or more cell identity documents (IDs).

5. The first network element of claim 1, wherein the external location information comprises at least one of:

location information determined based on global positioning system (GPS) positioning; or location information determined based on latitude-and-longitude coordinates.

6. The first network element of claim 1, wherein the QoS analytics request further contains at least one of:

first indication information indicating the first network element to notify a specific value of QoS of the analytics target corresponding to external location information;

second indication information indicating the first network element to notify a difference between a reporting threshold and the specific value of the QoS of the analytics target corresponding to the external location information; or third indication information indicating the first network element to notify at least one of: a condition on which the specific value of the QoS of the analytics target corresponding to the external location information satisfies the reporting threshold, or a condition on which the specific value of the QoS of the analytics target corresponding to the external location information does not satisfy the reporting threshold.

7. The first network element of claim 6, wherein the QoS analytics request further comprises analytics-applicable time and the reporting threshold; and in terms of notifying, to the second network element, the QoS of the analytics target corresponding to the external location information according to the QoS analytics request, the processor is configured to cause the transceiver to:

when the QoS analytics request contains the third indication information and the analytics-applicable time belongs to a historical time period, notify, to the second network element, at least one of: a condition on which a historical QoS value of the analytics target corresponding to the external location information and the analytics-applicable time satisfies the reporting threshold, or a condition on which the historical QoS value of the analytics target corresponding to the external location information and the analytics-applicable time does not satisfy the reporting threshold.

8. The first network element of claim 6, wherein the QoS analytics request further comprises analytics-applicable time and the reporting threshold; and in terms of notifying, to the second network element, the QoS of the analytics target corresponding to the external location information according to the QoS analytics request, the processor is configured to cause the transceiver to:

when the QoS analytics request contains the third indication information and the analytics-applicable time belongs to a future time period, notify, to the second network element, at least one of: a condition on which a predicted QoS value of the analytics target corresponding to the external location information and the analytics-applicable time satisfies the reporting threshold, or a condition on which the predicted QoS value of the analytics target corresponding to the external location information and the analytics-applicable time does not satisfy the reporting threshold.

9. The first network element of claim 1, wherein the first network element is a network data analytics function (NWDAF) network element.

10. The first network element of claim 1, wherein the processor is further configured to cause the transceiver to:

receive, from an intermediate network element, a mapped QoS analytics request, wherein the mapped QoS analytics request is obtained by mapping external location information in the QoS analytics request from the second network element to internal location information;

in terms of notify, to the second network element, the QoS of an analytics target according to the QoS analytics request from the second network element, the processor is further configured to cause the transceiver to:

notify, to the second network element, QoS of the analytics target corresponding to the internal location information according to the mapped QoS analytics request;

wherein the external location information is location information determined by the second network element, and the internal location information is location information used by a core network.

11. A second network element, comprising:

a transceiver;

a memory configured to store executable instructions; and a processor configured to execute the executable instructions stored in the memory to cause the transceiver to:

receive, from a first network element, quality of service (QoS) of an analytics target, the first network element having data analytics capability, the QoS of an analytics target being responsive to a QoS analytics request from the second network element, and the analytics target being indicated by the QoS analytics request;

wherein the QoS analytics request contains external location information, and the external location information is location information determined by the second network element; and in terms of receiving, from the first network element, the QoS of an analytics target, the processor is configured to cause the transceiver to:

receive, from the first network element, QoS of the analytics target corresponding to the external location information.

12. The second network element of claim 11, wherein in terms of receive, from the first network element, the QoS of the analytics target corresponding to the external location information, the processor is further configured to cause the transceiver to:

receive, from the first network element, the QoS of the analytics target corresponding to the external location information, according to QoS of the analytics target corresponding to internal location information, wherein the internal location information is obtained by mapping the external location information to internal location information, the internal location information is location information used by a core network, and the QoS of the analytics target corresponding to the internal location information is obtained according to a mapped QoS analytics request.

13. The second network element of claim 11, wherein the external location information comprises at least one of:

location information determined based on global positioning system (GPS) positioning; or location information determined based on latitude-and-longitude coordinates.

14. The second network element of claim 11, wherein the QoS analytics request further contains at least one of:

first indication information indicating the first network element to notify a specific value of QoS of the analytics target corresponding to external location information;

second indication information indicating the first network element to notify a difference between a reporting threshold and the specific value of the QoS of the analytics target corresponding to the external location information; or third indication information indicating the first network element to notify at least one of: a condition on which the specific value of the QoS of the analytics target corresponding to the external location information satisfies the reporting threshold, or a condition on which the specific value of the QoS of the analytics target corresponding to the external location information does not satisfy the reporting threshold.

15. The second network element of claim 14, wherein the QoS analytics request further comprises analytics-applicable time and the reporting threshold; and in terms of receiving, from the first network element, the QoS of the analytics target corresponding to the external location information, the processor is configured to cause the transceiver to:

when the QoS analytics request contains the third indication information and the analytics-applicable time belongs to a historical time period, receive, from the first network element, at least one of: a condition on which a historical QoS value of the analytics target corresponding to the external location information and the analytics-applicable time satisfies the reporting threshold, or a condition on which the historical QoS value of the analytics target corresponding to the external location information and the analytics-applicable time does not satisfy the reporting threshold.

16. The second network element of claim 14, wherein the QoS analytics request further comprises analytics-applicable time and the reporting threshold; and in terms of receiving, from the first network element, the QoS of the analytics target corresponding to the external location information, the processor is further configured to cause the transceiver to:

when the QoS analytics request contains the third indication information and the analytics-applicable time belongs to a future time period, receive, from the first network element, at least one of: a condition on which a predicted QoS value of the analytics target corresponding to the external location information and the analytics-applicable time satisfies the reporting threshold, or a condition on which the predicted QoS value of the analytics target corresponding to the external location information and the analytics-applicable time does not satisfy the reporting threshold.

17. The second network element of claim 11, wherein the processor is further configured to cause the transceiver to:

send a QoS analytics request to an intermediate network element, the QoS analytics request indicating the intermediate network element to map external location information in the QoS analytics request to internal location information and send to the first network element a mapped QoS analytics request;

in terms of receive, from a first network element, QoS of an analytics target, the analytics target being indicated by the QoS analytics request, the processor is further configured to cause the transceiver to:

receive, from the first network element, QoS of the analytics target corresponding to the internal location information;

wherein the external location information is location information determined by the second network element, and the internal location information is location information used by a core network, the analytics target being indicated by the QoS analytics request.

18. A method for quality of service (QoS) analytics, performed by a first network element that has data analytics capability, the method comprising:

map external location information to internal location information, wherein the internal location information is location information used by a core network;

analyze QoS of an analytics target corresponding to the internal location information according to a mapped QoS analytics request; and notify, to a second network element, QoS of the analytics target corresponding to the external location information according to the QoS of the analytics target corresponding to the internal location information;

wherein the external location information is contained in a QoS analytics request from the second network element, and the external location information is location information determined by the second network element.

19. The method for QoS analytics of claim 18, wherein the external location information comprises at least one of:

location information determined based on global positioning system (GPS) positioning; or location information determined based on latitude-and-longitude coordinates.

20. The method for QoS analytics of claim 18, wherein the internal location information comprises at least one of:

one or more areas of interest (AOIs);

one or more tracking area identities (TAIs); or one or more cell identity documents (IDs).

* * * * *